Jan. 8, 1952 G. C. KOHL 2,581,418
MACHINE FOR CASTING HOLLOW ARTICLES
Original Filed Oct. 24, 1947 10 Sheets-Sheet 1

INVENTOR.
George C. Kohl
BY
ATTORNEY

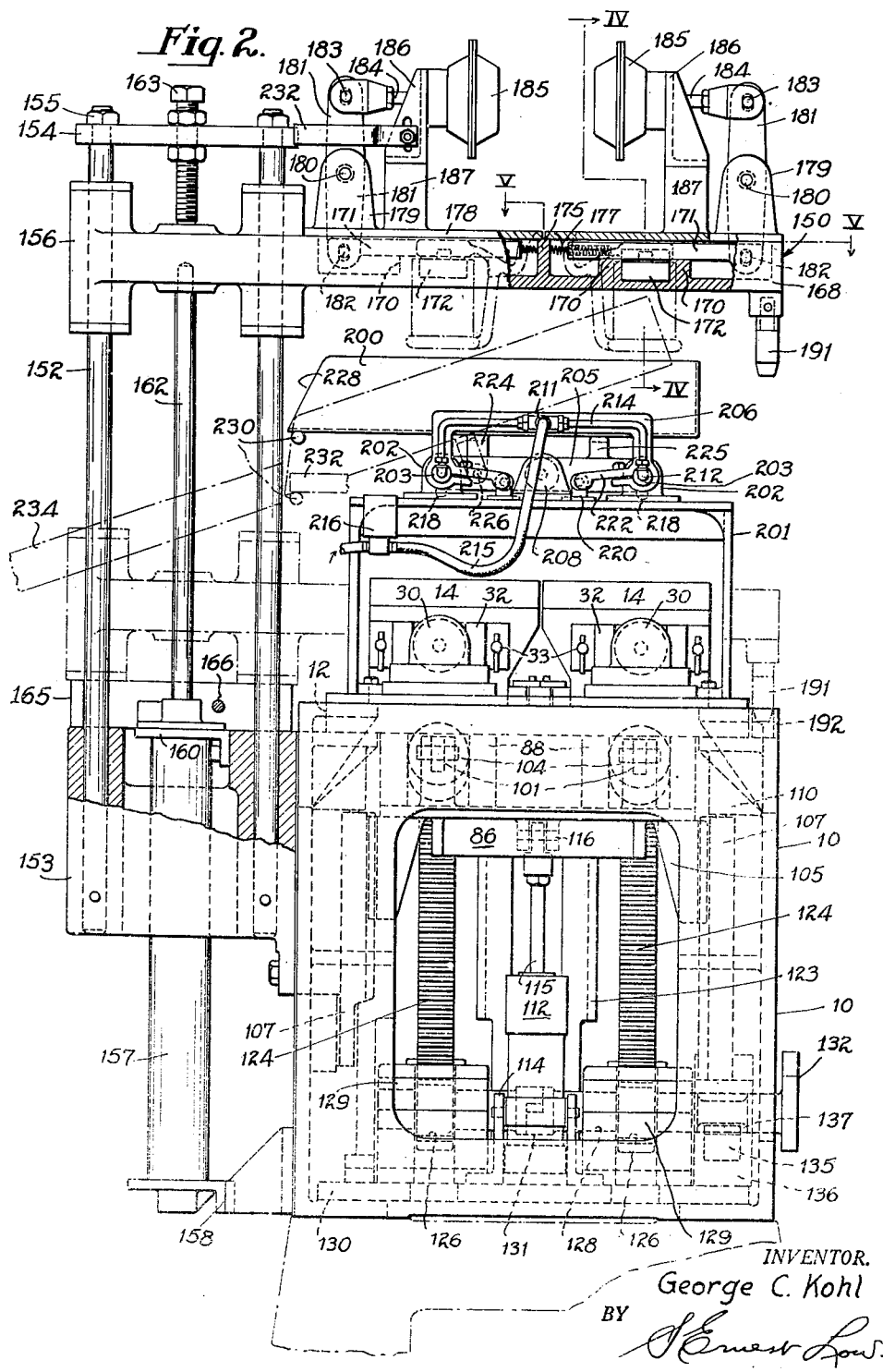

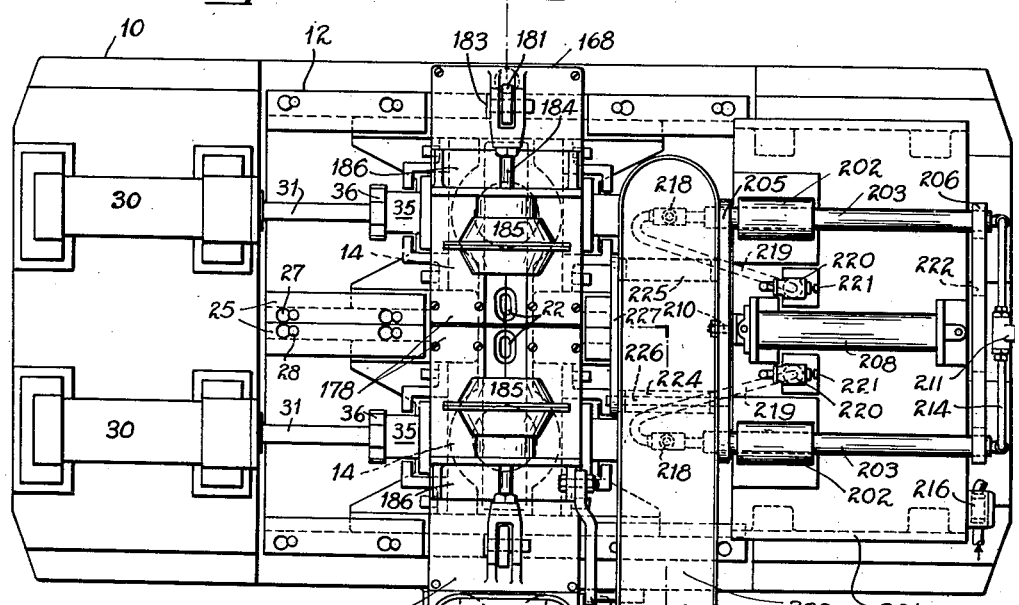
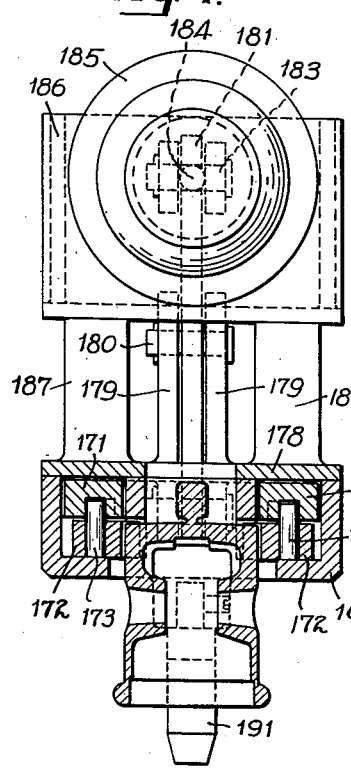
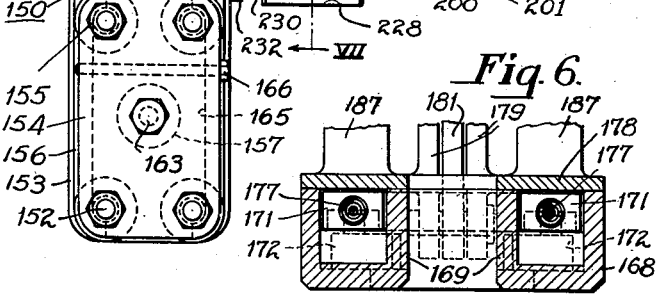
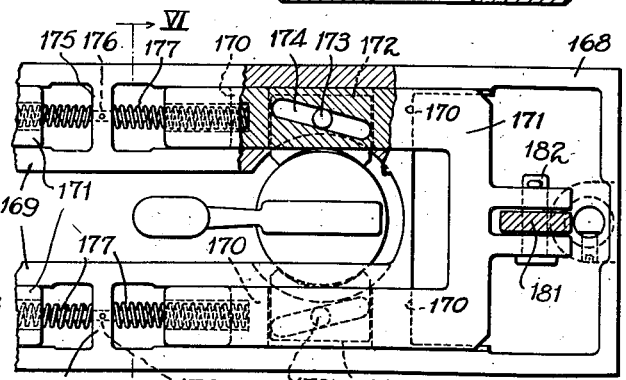

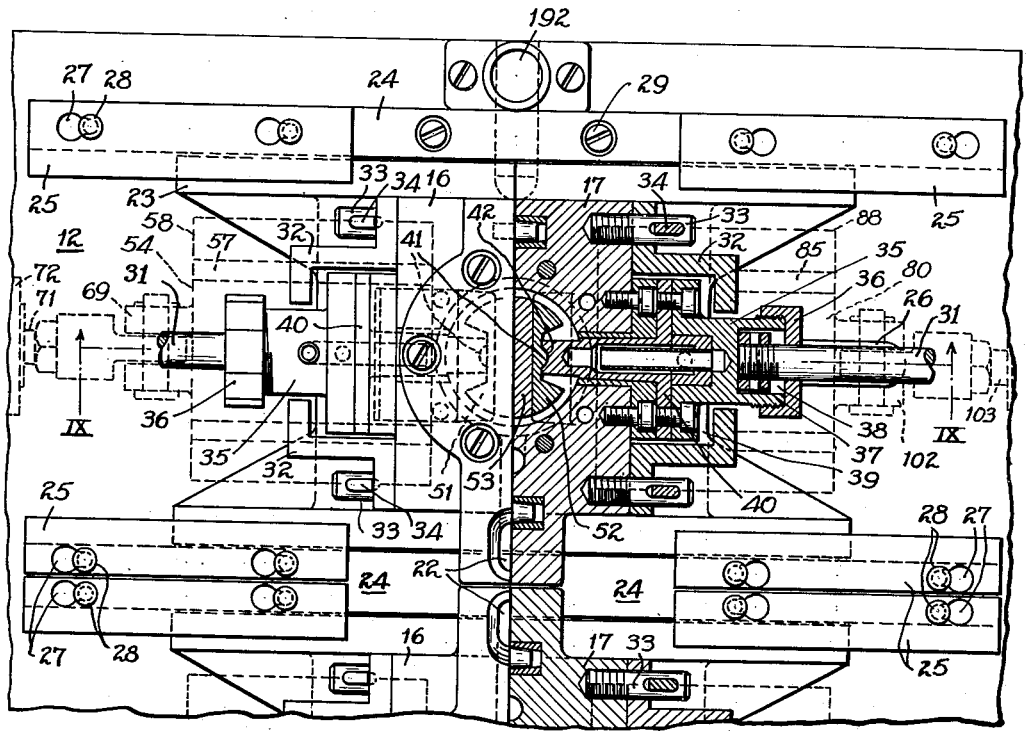
Fig. 8.
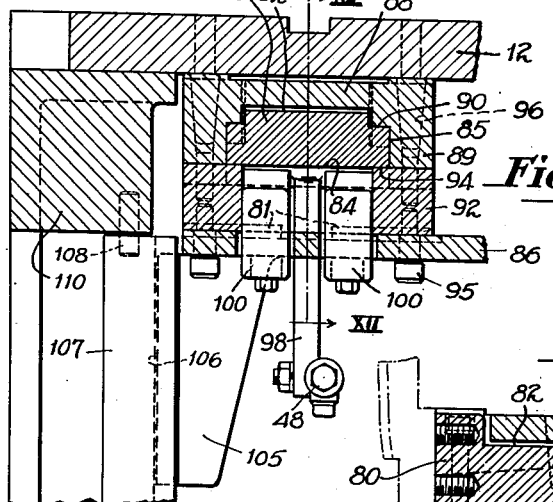
Fig. 11.
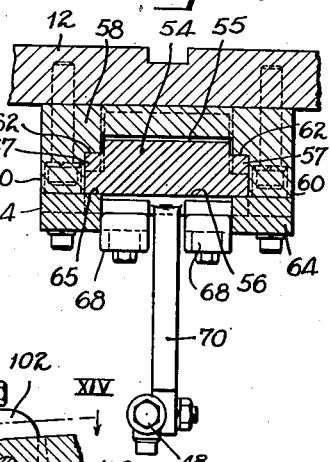
Fig. 13.
Fig. 12.
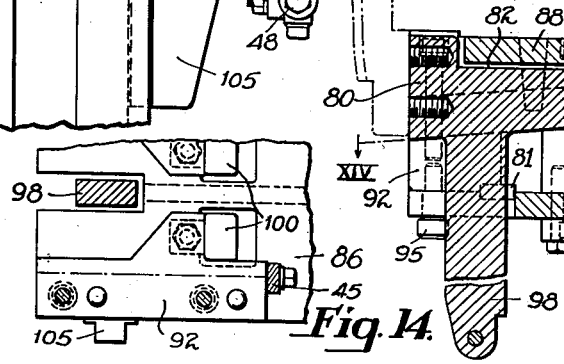
Fig. 14.
Inventor
George C. Kohl
By S. Ernest Low.
Attorney Jan. 8, 1952  G. C. KOHL  2,581,418
MACHINE FOR CASTING HOLLOW ARTICLES
Original Filed Oct. 24, 1947  10 Sheets-Sheet 7

INVENTOR
George C. Kohl
BY
*J. Ernest Low*
ATTORNEY

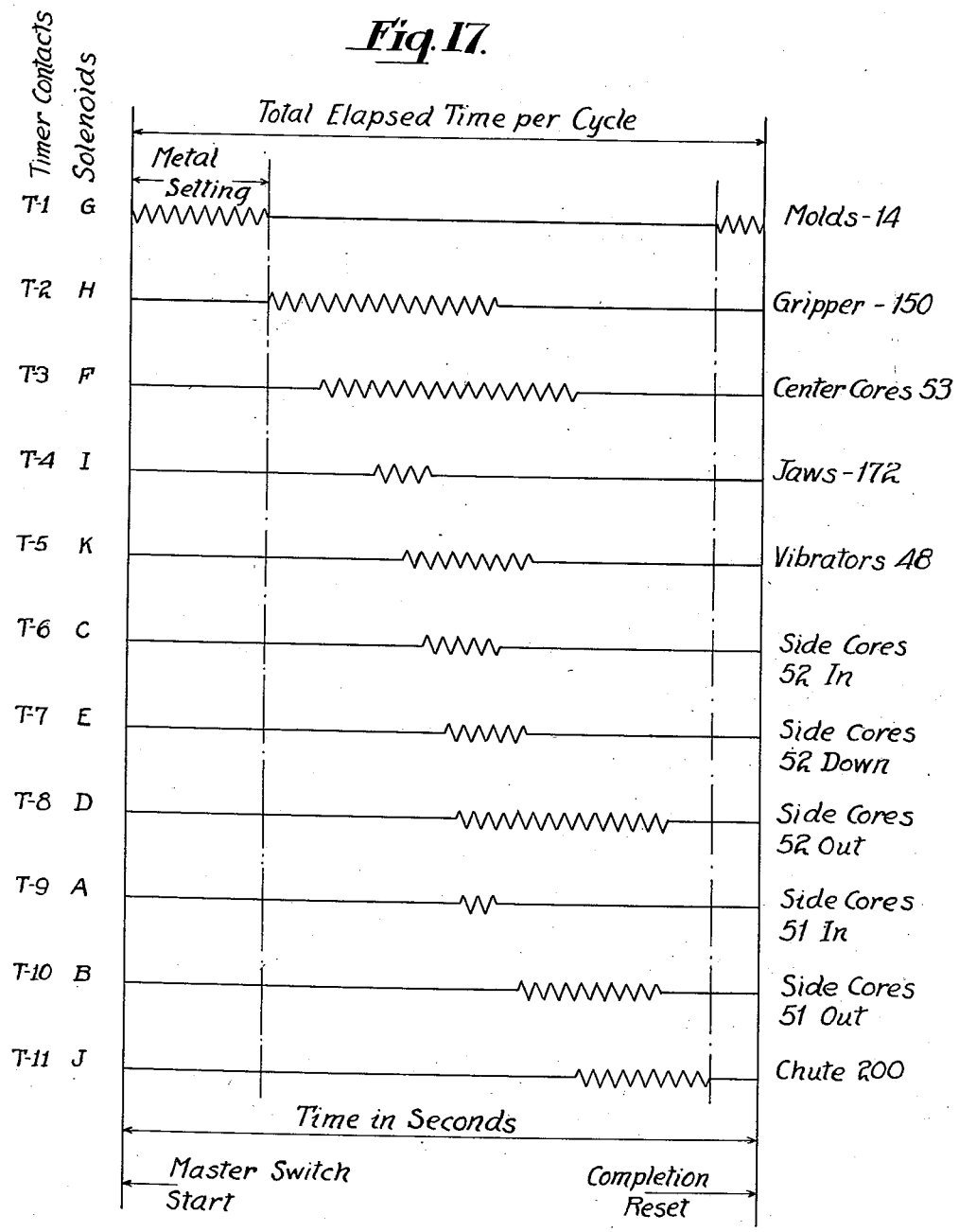

Patented Jan. 8, 1952

2,581,418

UNITED STATES PATENT OFFICE 2,581,418

MACHINE FOR CASTING HOLLOW ARTICLES

George C. Kohl, University Heights, Ohio, assignor to Aluminum Company of America, Pittsburgh, Pa., a corporation of Pennsylvania Continuation of application Serial No. 781,794, October 24, 1947. This application August 9, 1950, Serial No. 178,520

11 Claims. (Cl. 22—57)

This invention relates in general to the casting art and is more particularly concerned with the design and provision of improved casting mechanisms for producing substantially tubular articles, of which cup-shaped castings or pistons for internal combustion engines, which require in their production an internal core or patrix member or members in cooperative association with a mold member or members, are exemplary. It is in the piston casting field that the invention is hereinafter described in specific detail. This application is a continuation of my co-pending application, Serial No. 781,794, filed October 24, 1947, now abandoned.

Casting equipment in general for producing hollow or cup-shaped articles must of necessity provide some form of internal core structure associated with a mold member to define the article to be cast. Depending upon any specific article to be produced by casting, the internal core or patrix must cooperatively combine and function with a mold cavity or matrix to impart the desired configuration to the article to be cast. In the case of a piston for internal combustion engines, or the like, the internal core or patrix structure quite often becomes complicated in its design because of widely varying forms of internal ribs, bosses, and other internal configuration or contour, and although the invention is not limited to any particular cast article or object, it can be stated herein that solution of the problems presented in providing a satisfactory piston casting mechanism will serve equally well in many other types of casting equipment.

The casting mechanisms contemplated herein pertain in general to permanent molding apparatus as distinguished from green sand foundry practice and equipment, and by permanent mold apparatus or mechanism is meant that type of equipment which employs metal molds and metal cores, or similar permanent non-frangible materials, which lend themselves to repeated use in the duplication of accurately sized castings. It should also be understood that the various novel features incorporated in the casting mechanisms of this invention may be so coordinated, integrated and employed to function automatically as by power means, semi-automatically, in which some of the operations are performed by power and others manually, or entirely manually.

Certain inherent difficulties and disadvantages prevail in casting mechanisms as represented by their present state of development. Such prevailing disadvantages represent real problems in the casting art and it is a general object of the invention to alleviate, and for the most part, eliminate these problems. For example, a specific problem which has been satisfactorily solved by the mechanisms of this invention is that of eliminating the prevailing tendency of a molten metal charge to stick or adhere to a mold matrix or patrix during solidification of the molten metal in the production of a cast article.

It is well known that many metals and alloys, and particularly the low specific gravity metals and alloys of aluminum and magnesium, exhibit a severe tendency to adhere to metal mold matrix and patrix surfaces during solidification of a molten metal charge in a casting operation. Mold washes and other forms of plating and surface treatment have been effective to a degree in overcoming this situation, but it is still recognized that such mold and core treatments do not perform satisfactorily in all instances. Furthermore, mold washes and other surface treatments must be renewed periodically and their greatest use and benefit seem to be derived from their heat insulating values as distinguished from any alleviation of the aforementioned sticking problem.

The sticking tendency above referred to is greatly exaggerated in the case of castings having re-entrant portions on their interior cored surfaces. This is exemplified in the case of a piston in which the interior wrist pin bosses project inwardly from the piston skirt and are formed during a casting operation by profiled core members machined or otherwise formed to impart the desired interior configuration to the piston. Since the wrist pin boss-forming or controlling cores are relatively thin in cross section adjacent the bosses, and since such cores must extend outwardly beyond the casting cavity in a mold to a position where they may be freely manipulated by a mold operator, or power means, considerable flexing of the thin core sections is normally experienced which often results in unpredictable paths of movement of the cores during their removal from a finished casting. Any sticking of the core sections in contact with the solidifying metal cast thereagainst adds to the difficulty of extracting the cores, on completion of a casting operation, and subjects elements that should be otherwise normally and freely removable to bending strains and stresses, as well as to inaccurate movements, as measured in point of time and direction during a casting cycle. This deleterious condition is most pronounced in power operated molding apparatus wherein the entire cycle of manipulating the mold and core members is automatically performed in proper timed sequence without reliance upon manual core extraction, which latter manual operation may be delayed or interrupted at any time by an operator in the event one or more core sections require additional time to remove the same from a cast article within a complementary mold cavity.

A further problem that is attributable to the sticking tendency observed at the time of removal of core sections, following solidification of metal cast thereagainst, is the gouging or cutting action which often occurs when relatively thin, flexible core members are suddenly released at the instant the sticking tendency is overcome. This will be appreciated when it is considered that internal core or patrix members normally incorporate relatively sharp profiled edges, and when a core so constructed is initially held through adherence to the surface of a solidified casting and thereafter released in a stressed and flexed condition, the resultant path of movement of the core section could readily be in a path and direction to gouge or cut into a relatively soft internal surface of a newly solidified or embryonic casting.

Economy in the operation of a casting mechanism is generally measurable in terms of the time consumed in carrying through a complete casting cycle that can be here defined, in its simplest form, as comprising pouring a charge of molten metal into a mold, awaiting a fixed interval of time for freezing and solidification of the molten charge, exposing the solidified casting, withdrawing the core or cores from the interior of the casting, removing the stripped casting, and reassemblying the mold and core mechanisms for a subsequent casting operation. To the elapsed time of the casting cycle can be added the lost time resulting from shut-down periods for repairs and maintenance, and in the case of manually, or semi-manually operated mechanisms, the further time factor represented by operator fatigue and time-consuming manual operations must be taken into consideration in a final economy analysis of any particular casting apparatus.

Except in the ingot casting art, where relatively large, solid and heavy castings are produced, manual removal of castings from molds has, for the most part, been considered satisfactory.

In cases where the objects being cast are of a complicated design, such as pistons for internal combustion engines, and require complicated internal core members, in combination with a mold matrix, to define the finished product, manual removal of a cast piston from its mold and core structures may offer considerable difficulty as a result of the tendency of the internal cores to stick to the solidified casting charge. Furthermore, manual removal of castings in many cases, and in particular from molding mechanisms employing complicated internal core members, will normally entail and be accompanied by rough handling to free a casting from its internal core supporting structure.

Development of automatic and semi-automatic molding apparatus gives rise to an ideal situation for eliminating many of the time consuming operations normally associated with casting apparatus, and as a particular feature of the present invention, a mechanical core stripping device permits removing a casting in its embryonic state, following sufficient solidification to support the weight of the cast article, in which case the hot metal casting may be still quite soft, thereby eliminating rough handling on the part of an operator, as well as contributing to a reduction in an operator's time attending the mechanism.

It is also well known to cool casting equipment by means of circulating water, or other cooling media, internally or in contact with exposed surfaces of mold equipment, and it is also common practice to differentially retard heat extraction from a casting cavity in a mold to insure certain desirable metallurgical and casting characteristics during solidification and freezing of a casting charge of molten metal within the mold. For the most part temperature control of molding equipment has been directed primarily to the temperature of the article being cast, whether the temperature control technique or means for carrying out the technique is applied in the form of a heat extracting coolant, or selection and disposition of mold materials exhibiting differential heat conducting capacities.

The temperature control of a molding apparatus during a casting operation normally exhibits its beneficial result in the final cast object or product. There is still a problem, however, associated with the temperature at which the molding apparatus may be operated that does not necessarily involve either the casting technique or properties of a finished casting. This problem concerns the cooling or chilling of the casting apparatus, or portions thereof, during its period of non-use after each casting cycle or between successive casting operations. It will be understood that any temperature control that is essential to the production of a sound casting and which is employed during the actual introduction and solidification of a molten metal charge in a mold, is readily distinguishable from that heat retained by the molding equipment once a finished casting had been removed therefrom.

The enumerated problems, and many others that will be apparent to those skilled in this art, have been satisfactorily solved by the casting equipment of the present invention, as will be hereinafter described in specific detail.

It is an object of the present invention to provide an improved casting mechanism that incorporates in its construction positive means for accurately guiding an internal core or patrix member during its removal from and entry into a mold cavity or matrix.

It is another object to provide a casting mechanism for producing cup-shaped articles in which a multipart core or patrix serves in cooperative relationship with a mold to form a casting cavity, and in which the core parts are supported and positively guided during their removal from the entry into the mold to insure against faulty and unpredictable movement of the core parts relative to the mold and casting cavity formed therein.

Another object is to provide an improved casting apparatus in which an internal core or patrix member is employed with a mold member with means associated with the apparatus to relieve the tendency of the patrix to adhere to a casting produced in the apparatus.

A further object is to provide an improved casting apparatus in which means is provided for vibrating an internal core member to insure freeing the same from adherence with a molten metal charge cast thereagainst.

It is an object of the invention to provide a casting apparatus incorporating an internal core or patrix cooling or chilling mechanism for use between successive casting operations, or during non-use periods.

A further object is to provide a casting mechanism that incorporates in its construction a positive means for removing articles cast therein.

Another object is to provide a casting mechanism in which articles cast therein are positively held or gripped during the step of stripping an internal core therefrom.

A still further object is to provide a casting mechanism which is entirely automatic in its operation to assemble a mold and an internal core structure in cooperative relationship to serve as a molten metal receiving cavity, and thereafter function in proper timed sequence to grip a casting produced therein, withdraw a core, remove the casting and return the mechanism to cooperative relationship for a subsequent casting operation.

Numerous other objects and advantages will become apparent to those skilled in this art on consideration of the following description, when read in conjunction with the drawings attached hereto and forming a part hereof, in which:

Fig. 1 represents a rear elevational view of a casting mechanism incorporating the features of the invention in a coordinated assembly suitable for the production of cast pistons, or the like;

Fig. 2 represents an end elevation of the mechanism viewed from the right of Fig. 1, with parts broken away to more clearly show the mode of construction;

Fig. 3 represents a top plan view of the mechanism illustrated in Figs. 1 and 2;

Fig. 4 represents a fragmentary elevational view, to enlarged scale and in partial section, taken along the line IV—IV of Fig. 2;

Fig. 5 represents a fragmentary plan view, to enlarged scale, taken along the line V—V of Fig. 2;

Fig. 6 represents a sectional elevation taken along the line VI—VI of Fig. 5;

Fig. 8 represents a fragmentary plan view, to enlarged scale and in partial section, taken along the line VIII—VIII of Fig. 1;

Fig. 11 represents a fragmentary sectional elevation taken along the line XI—XI of Fig. 10;

Fig. 12 represents a fragmentary sectional elevation taken along the line XII—XII of Fig. 11;

Fig. 13 represents a fragmentary sectional elevation taken along the line XIII—XIII of Fig. 10;

Fig. 14 represents a fragmentary plan view taken along the line XIV—XIV of Fig. 12;

Fig. 17 represents a chart illustrating a cycle of operation of the mechanism.

Figure 1:
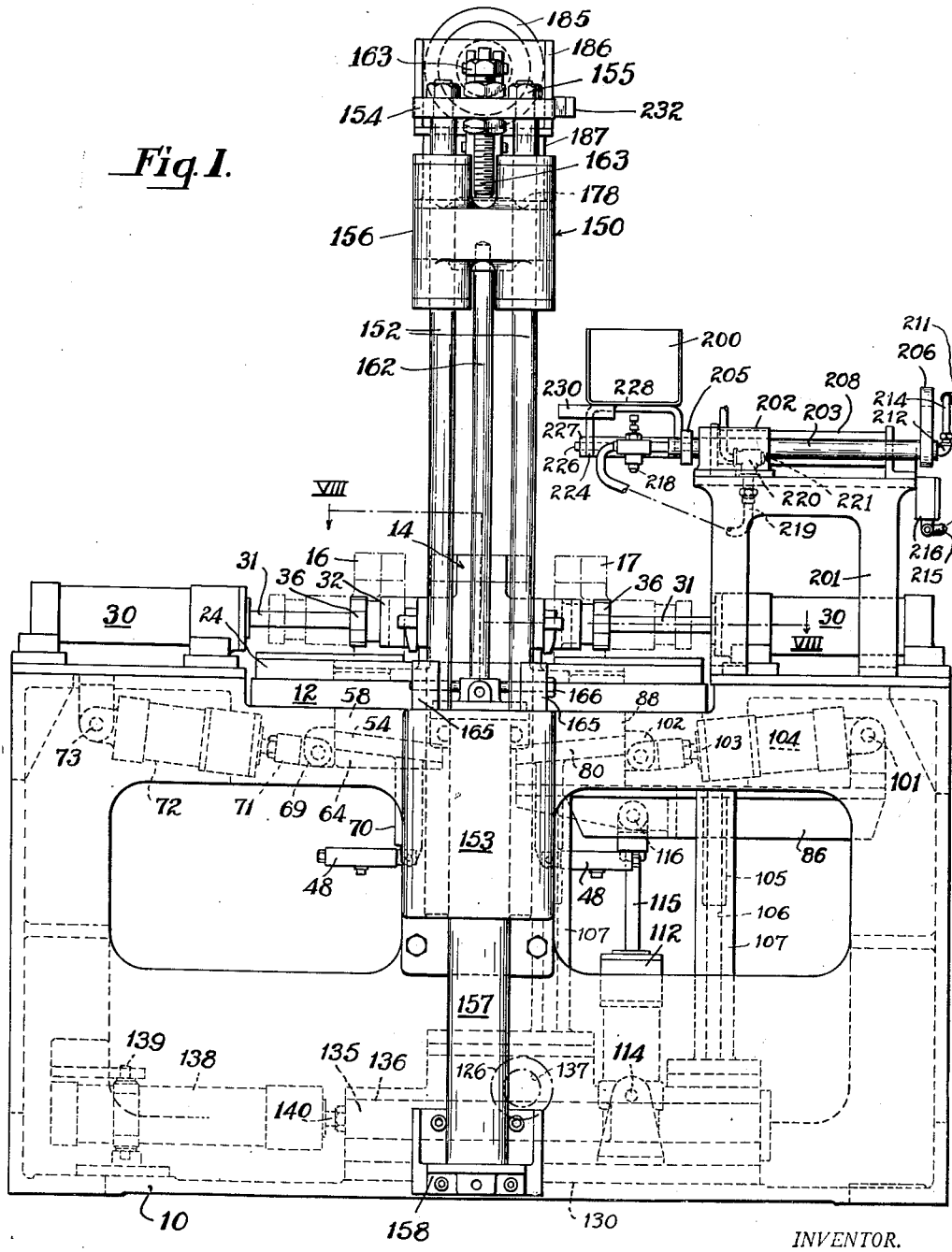

In general terms, the casting or molding mechanisms contemplated within the scope of the invention incorporate a mold or matrix which is machined or otherwise formed to define the entire or a substantial portion of the exterior surface of the cast article to be produced. A core or patrix member is associated with the mold and is adapted to be translated into and out of the mold to define therewith the interior surface of the cast article. The core is so mounted and actuated that its path of movement into and out of the mold is positively controlled in a manner to impart rectilinear movement which, on withdrawal, is away from and outwardly of the interior surface of the cast article which it has defined. This particular path of movement insures positive freeing of the core surface from contact with all newly cast surfaces defined by it in its casting position with respect to its complementary mold cavity. An angularly disposed guide member serving to support the core member, and defining the path of movement of the core, serves as the means for imparting the aforedescribed directional movement of the core which carries it way from and out of registry with all surfaces with which it was in contact during the casting operation. It will be observed that the specific path of movement of the core will assist in overcoming any resultant damage to a newly cast surface in the event that the core, or any portion thereof, tends to initially stick or adhere and is thereafter violently released, since no portion of the core coincides or registers with the initial defined surface of the casting following movement of the core as defined in terms of a path of movement away from and outwardly of, or out of registry with, the interior surface of the article being cast.

A further assurance against the sticking tendency between a core and the metal cast thereagainst is provided in the form of a vibratory means associated with the core for imparting a series of rapid impulses or blows to the core before any attempt is made to withdraw the same from the interior of a casting which it defines.

A further feature incorporated in the mechanisms contemplated within the scope of the invention pertains to a core chilling or cooling means associated with the core structure during the period in a casting cycle intermediate successive casting operations, or during a non-use period. The core chilling or cooling means comprises in its essentials a spray nozzle positioned adjacent the core during the interval in point of time between successive casting operations and insures a metered volume of coolant directed on the core surface. This feature of the invention has been successful in shortening the interval of non-use between casting operations, as well as accurately controlling the temperature of the molding apparatus to a degree that is reflected in alleviation of the adherence of the solidified molten metal to a core defining surface.

Coupled with the above listed features, the invention provides positive means for gripping and stripping a casting on completion of a casting operation preparatory to a subsequent casting operation. The gripper and stripper comprises, in general, a pair of gripping elements or shoes profiled to positively grasp a cast article on its exterior surface following exposure of the same by removal of the exterior defining mold, and while the cast article is still supported upon an interior core member. While thus grasped the internal core is withdrawn and the casting or cast article is thereafter transported within the gripping means to a new location where it is deposited out of interference with a subsequent casting operation.

All of the above mechanical features, singly and/or in combination, are adapted to be manually or power operated, a control system, incorporating a timer mechanism, being provided for automatic power operation of the combined elements and instrumentalities in specified timed sequence and relation.

General arrangement

A casting mechanism, selected for purposes of disclosing and describing one mode of practicing the invention, is illustrated in the form of a two mold piston casting machine. In the general arrangment of the illustrated mechanism a main base member or frame 10, preferably constructed in the form of a hollow housing made of cast iron, or the like, serves to support and house the various elements and subassemblies of the molding mechanism. A molding plate 12, preferably a heavy wear-resistant steel plate, is removably secured to the frame 10 within a depression (Fig. 1) in the upper surface of the same, and two piston casting molds 14 are suitably supported on the top surface of plate 12. The molds may be of any suitable construction so long as they permit exposure of a casting following its solidification. For example, multipart molds, hingedly mounted for oscillatory movement away from a cast article to expose the same, such as a book-type mold, or medially split molds, such as herein illustrated and comprising mold sections 16 and 17 that are slidably assembled on the mold plate 12, are within the contemplation of the invention, it being essential that the mold sections in assembled, molten metal receiving relationship present or form a casting cavity that defines the exterior surface of the cast article to be produced.

A core mechanism or system is mounted within the base 10 and below the molding plate 12. In the mechanism selected for purposes of illustration, the core mechanism, identified in its entirety by reference numeral 50 (Fig. 9), incorporates two oppositely disposed internal wrist pin boss-forming or side cores and a center core for each piston casting mold. Vibratory means 48 are also associated with one or more of the internal cores to assist in their removal from the interior of a cast piston.

A gripper and conveyor means, generally identified at 150, is reciprocally mounted with respect to the main base 10 for movement into gripping relationship with cast pistons, or the like, exposed by removing the molds 14 therefrom. The gripper 150 serves to grasp and securely hold the cast pistons while one or more of the internal cores are withdrawn therefrom, and serves the additional function of a conveyor to remove the cast pistons to a location out of interference with reassembly of the casting mechanism for a subsequent casting operation.

A piston receiving chute 200 is mounted on a translatory frame for movement into and out of piston receiving position beneath the gripper and conveyor member 150 (Figs. 1, 2, 3, 10 and 15). As will be hereinafter explained in more detail, the chute 200 is pivotally mounted on its translatory frame and is tilted to discharge pistons received therein in proper timed sequence in the operation of the piston casting mechanism.

Combined with the chute 200 and its translatory frame is a coolant or core chilling system. This system cooperates with the chute in its piston receiving position (Fig. 10) to direct a coolant spray upon the internal cores of the mechanism.

Figure 15:
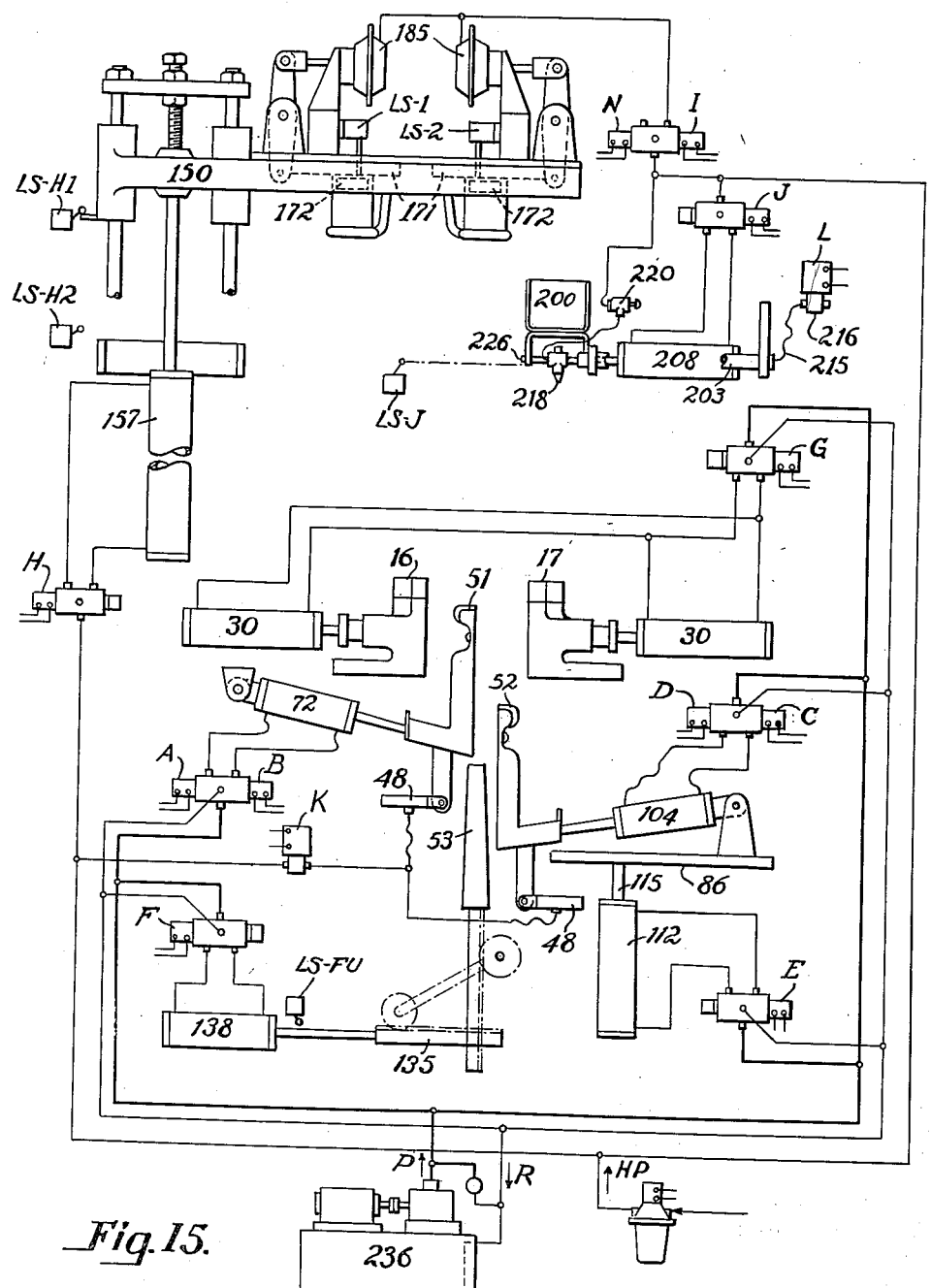
Fig. 15 represents a diagrammatic illustration of an integrated power system for the mechanism.
Figure 16:
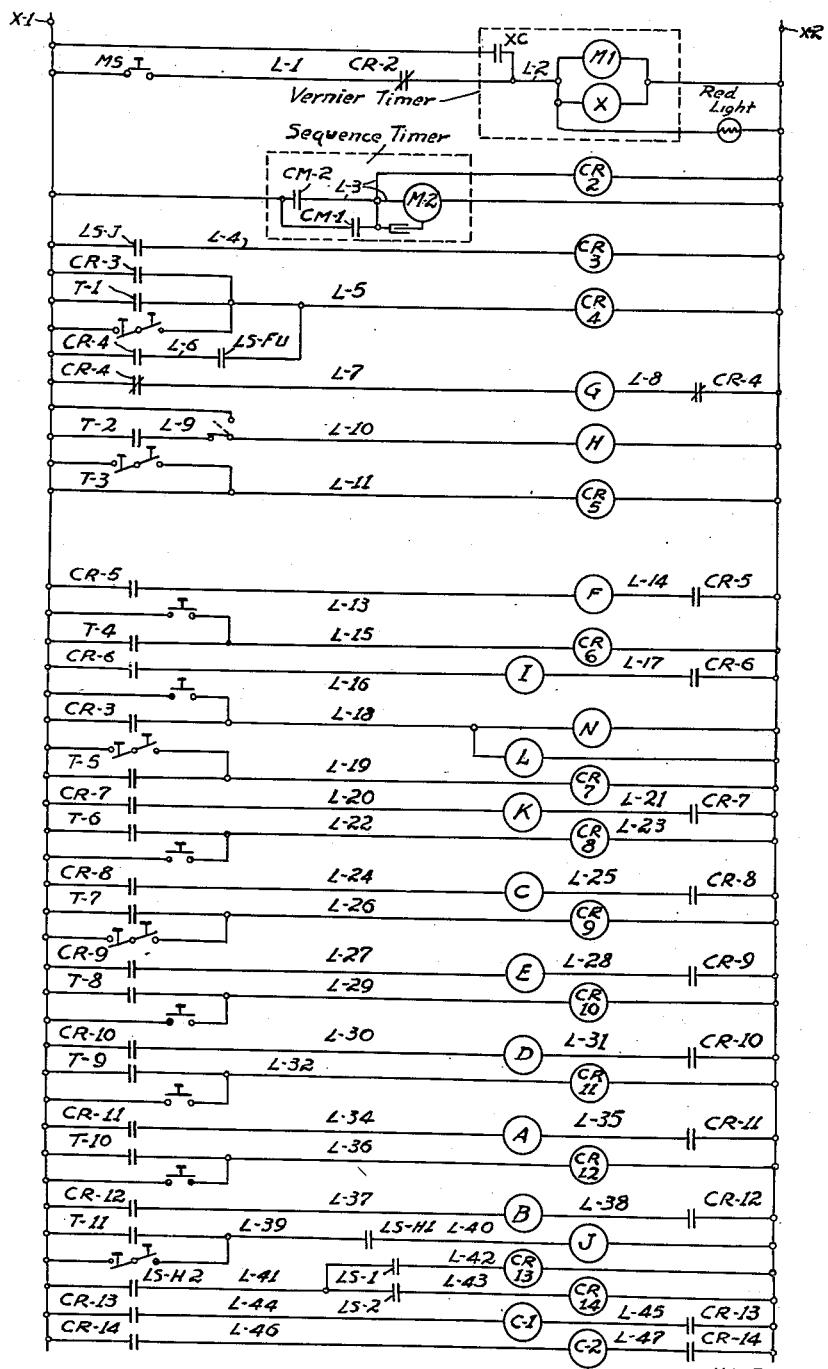
Fig. 16 represents a wiring diagram.

Although manual operation of the mechanism is contemplated within the scope of the invention, a power system is outlined in Fig. 15, and a wiring diagram for complete automatic operation of the mechanism is illustrated in Fig. 16. The power system and automatic control for the same will be taken up in detail hereinafter.

Mold and wrist pin cores

As previously indicated, molds 14 are slidably mounted on the top surface of molding plate 12 and each mold is medially split into sections 16 and 17 in the plane of the axis of the piston which it defines. In the preferred construction the mold sections 16 and 17 are usually each split along a horizontal plane, as at 18 (Fig. 7) and cap members 19 and 20, respectively, are bolted to each mold section in a unitary fashion. The prime purpose of such a construction is to provide ready access to machining, or otherwise forming or shaping the casting cavity, sprues, gates and risers in the mold sections, and the abutting surfaces in plane 18 may be scored or otherwise provided with radial grooves 21 extending from the casting cavity to atomsphere to serve as a mold venting means. The gating system 22 for each mold 14 may be of any suitable type, but in its preferred form a gating system similar to that described and claimed in Application Serial No. 761,087 (Charles G. Jancura), filed July 15, 1947, now matured into Patent No. 2,521,520, has been found highly satisfactory.

Molds 14 are equipped with laterally extending flanges 23 (Figs. 7 and 8), which in combination with gibs 24, keeper bars 25 and keys 26 serve to slidably secure and align the mold sections 16 and 17 on the molding plate 12. In order that ready replacement and substitution of molds 14 may be accomplished, keeper bars 25 are provided with keyhole slots or apertures 27 through which retention bolts or cap screws 28 extend. The bolt elements 28 threadingly engage in the gibs 24 which are suitably secured to the plate 12, as by means of countersunk screws 29 (Fig. 8). By slackening off the cap screws 28, keeper bars 25 are slidable in endwise direction (Fig. 8) to register the keyhole slot enlargements with the heads of members 28 to thereby permit removal of keeper bars 25, as well as removal and substitution of mold sections as desired.

Each mold section 16 and 17 is provided with means for reciprocating the same into and out of molten metal receiving and finished casting exposure position. In the preferred and illustrated form of the invention, fluid pressure operated cylinders 30 are suitably secured to the upper surface of the main base 10 and are connected through their connecting rods 31 with the mold sections 16 and 17. In the case of the illustrated piston casting mechanism, cores for forming wrist pin bores are coordinated and combined with the mold opening and closing mechanism. In the preferred form (Fig. 8 and 9) mold sections 16 and 17 are each provided with a pair of substantially Z-shaped brackets 32 secured to an outer face of each mold section by means of studs 33 and wedge pins 34. Each pair of Z-brackets 32 constitutes a housing within which a flanged cross head 35 is received. Each cross head 35 is connected to the exposed end of a connecting rod 31, extending into the housing formed by Z-brackets 32, by means of a lost motion connection comprising the threaded cap member 36 and pinned collar 37, the latter being attached to the extreme outer end of each connecting rod 31 and received within a cavity 38 in each of the flanged cross heads 35. The cross heads 35 are each connected, as by bolts or the like (Fig. 8), to flanged wrist pin cores 40, mounted in suitably bushed apertures through the mold sections 16 and 17, and each core 40 is proportioned in its length to extend into the casting cavity in the mold to form its intended wrist pin bore. By proper selection of the depth of cavity 38 and thickness of collar 37, the aforementioned lost motion connection between connecting rods 31 and cores 40 is accomplished.

A further lost motion connection 39 (Fig. 8) is provided between each of the cross heads 35 and associated mold sections 16 and 17. This lost motion connection takes the form of a definite clearance, within the housings formed by Z-brackets 32, as represented by the difference between the combined thickness of the abutting and bolted flanges on each of the cross heads 35 and cores 40 and the depth of each housing as measured under the inwardly turned or projecting flanges of Z-brackets 32. It will be seen that fluid pressure admitted to cylinders 30 to open the mold sections, as viewed in Fig. 8, will initially cause the connecting rods 31 to take up the lost motion 38 between collars 37 and the underside of caps 36 (Fig. 9) to loosen the wrist pin cores 40. Continued outward movement of the connecting rods 31 will cause cross heads 35 to take up the lost motion 39 within the housings formed by Z-brackets 32 to sequentially withdraw the wrist pin cores 40 and separate the mold sections 16 and 17. It will be apparent that the clearance 38, between each collar 37 and the underside of cap 36, may be so proportioned with respect to the clearance 39, between the flange on each of the cross heads 35 and inwardly turned flanges on the Z-brackets 32, that outward movement of the connecting rods 31 will initially serve to loosen and slightly withdraw the wrist pin cores 40, whereas continued movement will separate the mold sections 16 and 17.

Internal core mechanism

Figure 9:
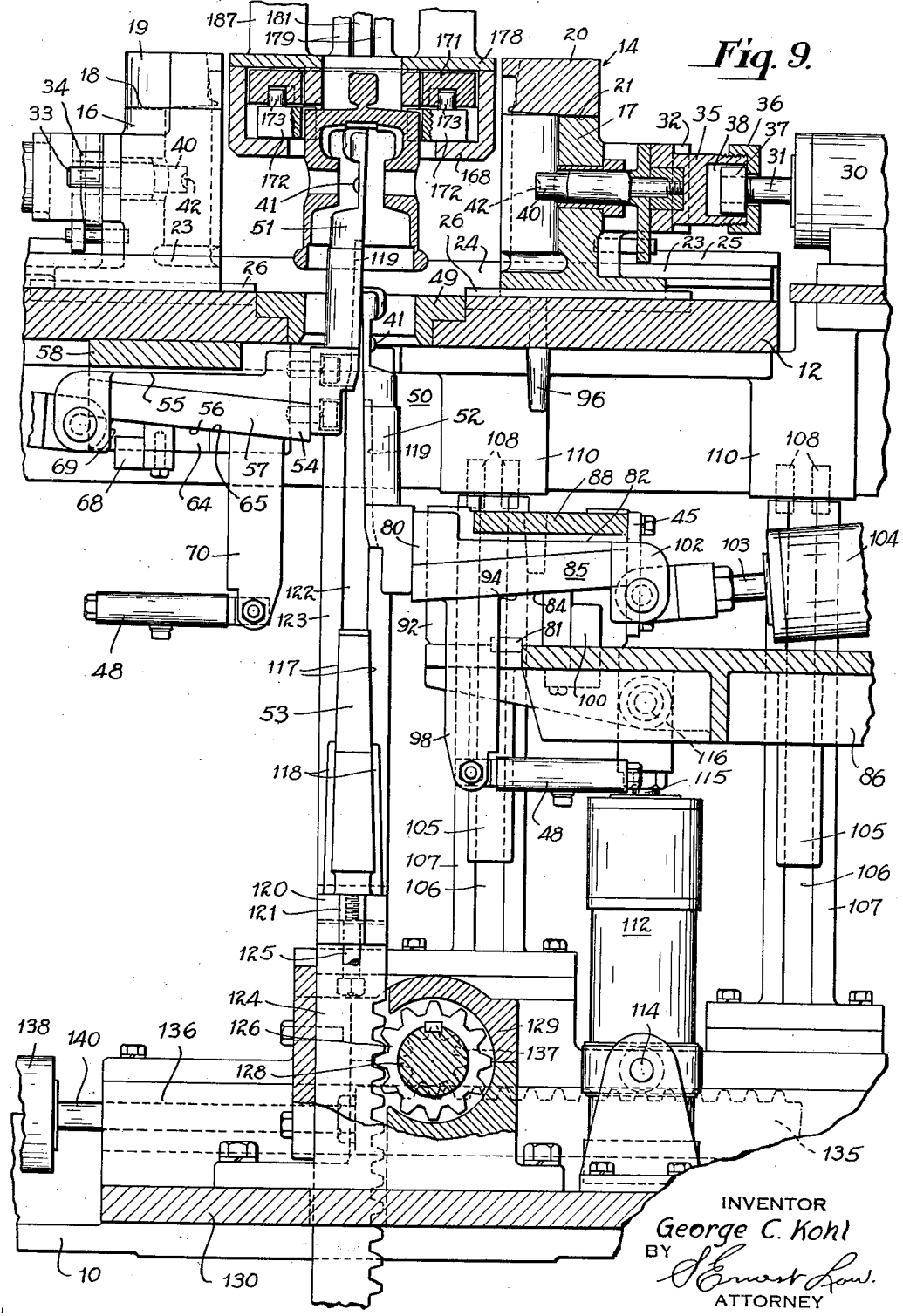
Fig. 9 represents a fragmentary partial sectional elevation taken along the line IX—IX of Fig. 8, and illustrating relatively movable parts of the mechanism in a selected intermediate core stripping position.

The internal core mechanism, as distinguished from the wrist pin cores 40, has been generally identified hereinabove by the reference numeral 50 (Fig. 9). Since the selected illustration of molding mechanism pertains to a piston casting machine, the internal core structure is now described in terms of such a machine for casting pistons in which the unobstructed distance between the interiorly projecting wrist pin bosses is less than that distance occupied by the internal core members employed to form the wrist pin bosses, if such core members were positioned back to back within the interior of a cast piston. With such a dimensional relationship as here described, it would be impossible to withdraw a cast piston over two side core members positioned back to back in the plane of the central vertical axis through the piston on completion of a casting operation.

Internal core mechanism 50 includes at least two oppositely disposed wrist pin boss-forming side cores 51 and 52 and a central core member 53 in cooperative association with each mold 14. In the apparatus selected for illustrating the invention, side cores 51 and 52 are identical insofar as their profile is concerned. However, the manner in which these side cores are supported and manipulated is quite different because of the aforesaid dimensional relationship, or narrow width of the unobstructed distance between the internal wrist pin bosses.

Figure 10:
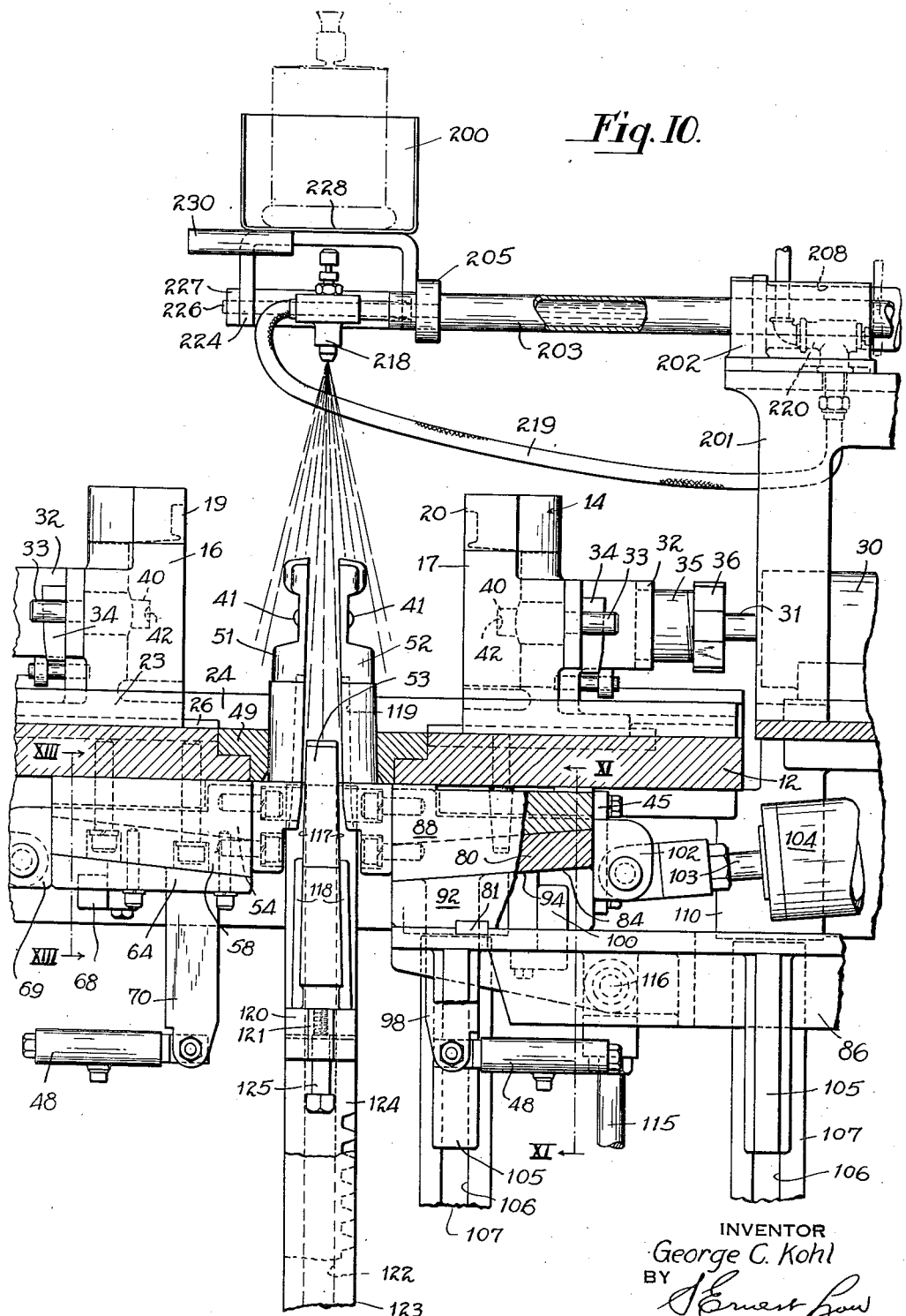
Fig. 10 represents a fragmentary partial sectional elevation similar to Fig. 9 and illustrating relatively movable parts of the mechanism in relation to a later stage in the operation of the mechanism.

Each side core 51 is secured, as by machine screws or the like, at its lower end below the under surface of molding plate 12 to a tapered or wedge-shaped shoe element 54. Member 54 has a flat upper surface 55 (Figs. 9 and 13), lower inclined surface 56 and laterally extending flanges 57, the upper surfaces of which are parallel with the lower inclined surface 56. A complementary guide box is fixedly mounted on the underside of molding plate 12 for receiving and supporting member 54. The guide box comprises an upper section 58 secured to the underside of plate 12, as by suitable cap screws. Section 58 is of generally inverted U-shape in cross section, its downwardly depending legs or flanges 60 terminating on an inclined plane of the same slope as the under surface of member 54, and the depending flanges 60 are rabbeted at 62 to conform with the slope and thickness of lateral flanges 57 of member 54. Bottom plates (two in number) or retainer strips 64 are secured to the underside of depending flanges 60 and present inclined surfaces 65 in supporting and bearing relationship with respect to the underside of member 54. The plates 64 are centrally spaced from each other to provide clearance for a depending rib or tang 70, integrally formed on the underside of member 54 (Figs. 9, 10 and 13), as well as permit upward extension of replaceable stop blocks 68, secured to the underside of each plate 64 and extending upwardly into position to abut with depending webs forming integral lugs 69 with the rear end or edge of shoe member 54 (Figs. 9 and 10).

It will be observed from the described construction of shoe member 54, and its complementary guide box, that relative movement between the shoe 54 and its guide box will cause its attached side core 51 to move inwardly towards the center of the piston (Fig. 9) in a straight line path that is inclined downwardly and inwardly towards, and on projection forms an acute angle with, the vertical central axis of the cast piston. To obtain this rectilinear movement of a side core 51, its shoe 54 is clevis and pin connected through the medium of the aforementioned lugs 69 to the end of connecting rod 71, which extends outwardly from a power cylinder 72, pivotally secured at 73 to the underside of the main base 10 (Figs. 1 and 8). It will also be fully understood that normal clearances will be provided between the shoe 54 and its complementary guide box for free sliding relative movement therebetween.

Each side core 52 is likewise provided at its lower end beneath the molding plate 12 with a tapered or wedge-shaped shoe member 80 rigidly secured thereto. The shoe member 80 presents a flat upper surface 82 (Figs. 9 and 12), lower inclined surface 84 and extending lateral flanges 85, the upper surfaces of which lateral flanges are parallel with the inclined surface 84. A complementary guide box for shoe 80, seen to best advantage in Figs. 9, 10, 11, 12 and 14, is mounted on the upper or top surface of a platform 86 located beneath the aforementioned molding plate 12. The guide box for shoe 80, and its integrally attached core 52, comprises an upper section 88 of generally inverted U-shape in cross section, its downwardly depending legs or flanges 89 terminating on an inclined plane of the same slope as the under surface 84 of the shoe 80. The depending flanges 89 are rabbeted as at 90 to conform with the slope and thickness of flanges 85 of member 80. Bottom plates (two in number) or retainer strips 92 are secured to the underside of depending flanges 89 and provide inclined surfaces 94 in supporting and bearing relationship with respect to the inclined surface 84 of shoe member 80. The guide box thus far described is attached to the platform 86 by means of cap screws 95 (Fig. 11), or the like, extending up through normal clearance holes in the platform from its underside, and in the preferred form of the invention the guide box is aligned and centered with the underside of molding plate 12 by means of tapered dowel pins 96 projecting downwardly into complementary apertures in the top surface of inverted U member 88. In addition to the aforesaid dowel pins 96 (Figs. 9 and 11), keys 81 are also preferably provided in combination with the supporting structure for a side core 52, particularly where more than one mold 14 and side core 52 are incorporated in a single casting mechanism. The keys 81 extend into keyways cut or otherwise formed in the top surface of platform 86 and undersurface of retainer members 92 and serve, in combination with normal clearances provided in the tapered apertures receiving dowel pins 96 and clearance holes for bolts or screws 95, to permit self adjustment of the guide boxes for shoes 80 to compensate for dimensional changes between adjacent mold centers on the plate 12 arising out of expansion of this plate.

As in the case of side core 51, the retainer strips 92 are centrally spaced from each other to provide an aperture and clearance for a depending rib or tang 98, integrally formed on the underside of shoe member 80 (Figs. 7, 9, 10, 11, 12 and 14), as well as permit upward extension of replaceable stop blocks 100, secured to the underside of each retainer strip 92 and extending upwardly into position to abut with the depending webs forming integral lugs 102 with the rear end or edge of shoe member 80.

Relative movement between shoe member 80 and its guide box will cause its attached core 52 to move in a straight line path that is inclined downwardly and inwardly towards, and on projection forms an acute angle with, the vertical central axis of a cast piston (Fig. 9). To obtain this rectilinear movement, the lugs 102 of shoe member 80 are clevis and pin connected to the end of connecting rod 103 which extends outwardly from power cylinder 104. Power cylinder 104 is pivotally attached at its rear end at 101 to the top surface of platform 86 (Fig. 1).

The platform 86 is vertically movable beneath the molding plate 12 to carry therewith each of the cores 52 and its associated guide box and cylinder 104. Platform 86 is substantially square, as viewed in the plane of its top surface, and is provided with integrally formed or attached depending guide brackets or wings 105 which slidingly engage within keyways 106 formed in four vertical columns 107. The columns 107 are secured at their bases to rigid and stationary portions of the base member 10, and members associated therewith, and are vertically aligned by means of dowel pins 108 extending between the upper ends of the columns and the underside of bosses 110 depending from the underside of base member 10 (Figs. 2, 7, 9 and 10). In the preferred construction a slight clearance is provided between the upper ends of columns 107 and the under surfaces of bosses 110 (Fig. 9). This clearance permits growth of the columns without any binding and bowing action as a result of temperature differentials accruing from casting operations.

Figure 7:
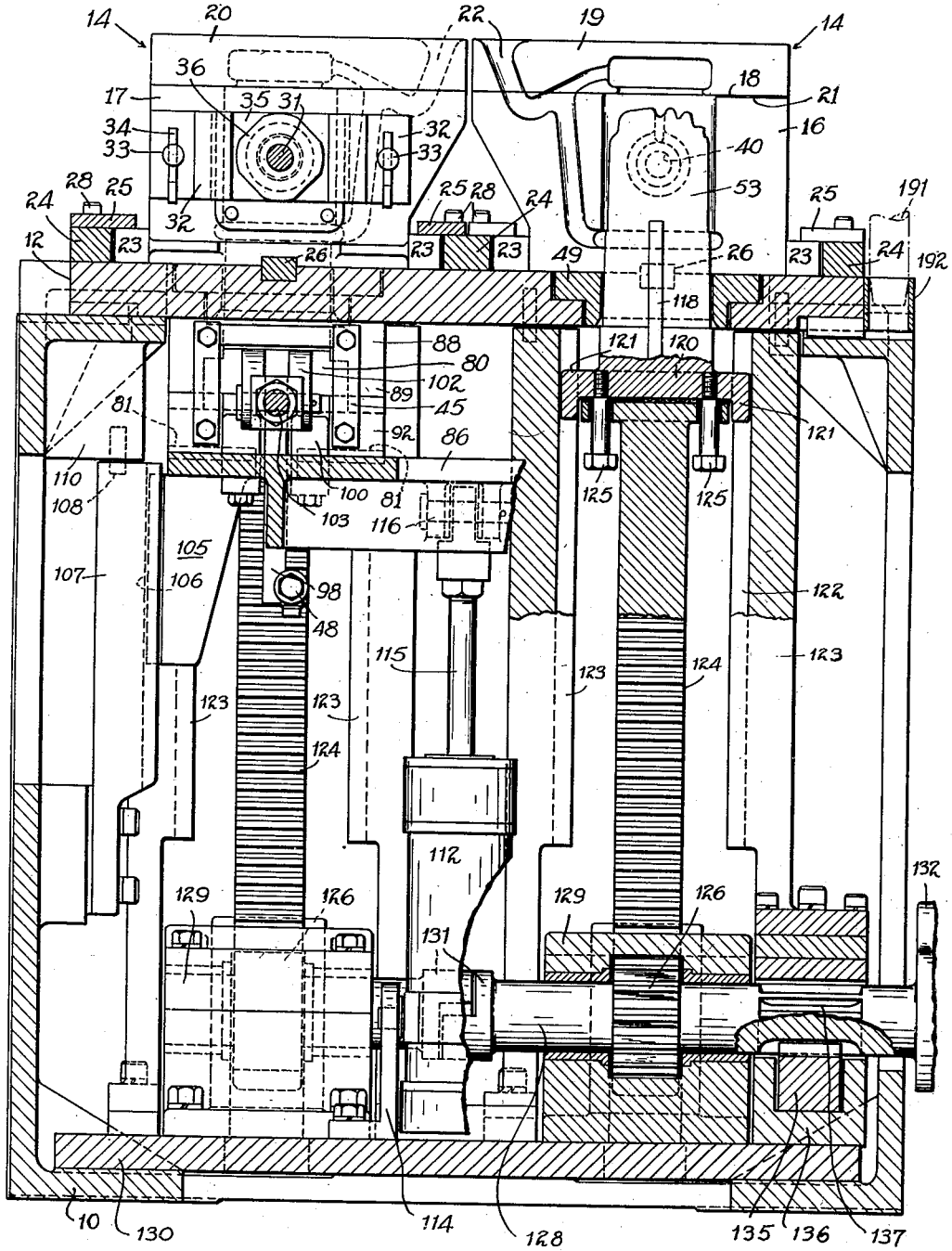
Fig. 7 represents a sectional elevation, to enlarged scale, taken along the line VII—VII of Fig. 3.

A power cylinder 112, substantially centrally located beneath platform 86, as viewed in Figs. 2 and 7, but towards the inner core supporting end, as viewed in Figs. 1, 9 and 10, is pivotally supported on a fixed trunnion bracket 114 at its lower end, and its connecting rod 115 is clevis and pin connected at 116 to the underside of platform 86. This power cylinder installation and connection to platform 86 provides means for vertical reciprocation of the cores 52 as will be described in more detail in the operation of a complete casting cycle.

It will be understood from the description thus far of side cores 51 and 52 that they are slidably mounted in guide boxes beneath the molding plate 12. In this connection, inward movement of each side core 51 (Figs. 9 and 10) will be positively arrested by the vertical faces of the lugs 69 of each shoe 54 coming into abutment against the stop blocks 68. This abutting relationship definitely and positively establishes the extent of movement of a core 51 in towards the vertical central axis of a cast piston for each selected width of stop block 68. Outward movement of each of the cores 51 is also positively controlled by a ring member 49, which is preferably a hardened and accurately ground steel annulus set into a recessed or shouldered aperture extending through the mold plate 12 (Figs. 7, 9 and 10) in axial alignment with the vertical axis of each mold cavity. It will be observed that the lower arcuate body portion of each core 51 will abut against the surface of the bore of ring 49 (Fig. 10) when the core is in its outer, or casting position.

Similarly, each core 52 is limited in its inward movement by stop blocks 100. Outward movement of core 52, however, when in a lowered position, is controlled by stop strips 45 (Figs. 7, 9, 10, 12 and 14) secured to the rear or back ends of guide box members 88 and 92, which strips are spaced apart sufficiently to clear the lugs 102 of shoes 80, but otherwise arrest outward movement of the shoes as viewed in Figs. 9 and 10. The reason for the necessity of stop strips 45 in association with cores 52, as distinguished from the absence of such stop strips in association with cores 51, is explained on the basis that cores 52 are moved outwardly in their lowered position (Fig. 9), in which case they could abut against the bore in ring 49, as a consequence of a particular design of core and the particular sequence of movements in an operating cycle of the mechanism to be later described.

The central core member 53, for each pair of side cores 51 and 52, is vertically retractable. This core has been illustrated as a single element (Figs. 7, 8, 9 and 10), but it will be understood that it may be a sectional member composed of relatively movable lateral side sections and a central section. The central core 53 fills the space between the side cores 51 and 52, when they are in assembled position (Fig. 10) within the casting cavity of a mold 14, and completes the interior configuration of the piston being cast. For this purpose the oppositely disposed sides or faces 117 of central core 53, which abut against the interior faces of cores 51 and 52 in assembled relationship (Fig. 8), are tapered towards the top of the core to aid in its assembly and extraction. Also, keys or projecting rails 118 are provided on the faces 117 for registry with complementary keyways 119 in the side cores 51 and 52, to insure alignment and correct positioning of the three cores 51, 52 and 53 in assembled relationship.

The core 53 is formed with an attached or integral flange 120 (Fig. 7) at its lower end, which flange has oppositely disposed integral projections 121 that extend into keyways 122 formed in a pair of vertical guide columns 123. The columns 123 are secured at their lower ends relative to the main base 10 and are provided with dowel pin connection to the underside of the molding plate 12 in the same manner as described for columns 107.

A vertically disposed rack bar 124 is connected to the lower end of each central core 53 through a lost motion connection, as indicated by the extended bolts 125. Each rack bar 124 meshes with a pinion 126 (Figs. 7 and 9) keyed to a two-piece shaft 128. Shaft 128 is carried in journal bearings 129 secured in aligned relationship to a plate 130 within the interior of base member 10 and stationarily fixed with respect thereto. Coupling flanges 131 on the adjacent ends of two-piece shaft 128 provide for lost motion rotation between the two sections of the shaft, and a striking plate 132 secured to an outboard end of one section of the shaft, as viewed in Figs. 2 and 7, provides a striking surface that may be struck by mallet, or the like, to relieve an otherwise sticking center core 53, if the occasion arises.

Power means for operating the central cores 53 is provided in the form of a horizontal rack bar 135 (Figs. 1, 2, 7, 9 and 15) suitably located and guided within a housing 136 extending across the front face of the casting machine and within the base 10. Rack bar 135 meshes with pinion teeth 137 cut into the shaft 128 (Figs. 7 and 9) and is reciprocated by means of a power cylinder 138, that is pivotally secured at its outer end at 139 (Fig. 1) to an interior portion of base 10, and has its connecting rod 140 attached to the rack bar 135.

The aforementioned vibrating members 48, which are preferably any well known type of commercial pneumatic impulse vibrators, have been illustrated as secured to the depending tangs 70 and 98. It will be understood that, on actuation or activation of vibrators 48, a series of rapid vibratory impulses will be delivered to each of the side cores 51 and 52 through the medium of their supporting shoes 54 and 80, respectively, with which the tangs 70 and 98 are integrally formed. It should also be understood that a similar vibrator could be attached to the center core 53, if desired, or the mold sections 16 and 17 could be vibrated in place of one or more of the internal cores, or simultaneously therewith.

*Gripper and conveyor mechanism*

The gripper mechanism, previously identified in its entirety by the reference numeral 150, is reciprocally mounted for vertical movement towards and away from the molds 14. The mounting for the gripper mechanism consists of four vertical posts or shafts 152 secured at their lower ends (Fig. 2) in a suitable bracket 153 attached to a pad or machined surface on the rear side of base 10. The upper ends of the four posts 152 are tied together by means of a plate 154 and nuts 155, threaded on reduced end portions of posts 152, to form a rigid structure.

Gripper mechanism 150 incorporates a cross head 156 (Figs. 1, 2 and 3), formed as an integral portion thereof, which is guided and supported on the posts 152 for reciprocal movement with respect thereto. A power cylinder 157, preferably pneumatic because of the relatively long working stroke required, is secured at its lower end (Figs. 1 and 2) to a bracket 158 attached to the main frame 10, and is similarly attached at its upper end in vertical axial alignment by a bracket 160 carried by the post-supporting bracket 153. Cylinder 157 is equipped with the usual piston (not shown) and connecting rod 162 which is centrally attached by threaded connection, or the like, to the cross head 156. An adjustable stop bolt 163 extends downwardly through the tie plate 154 into abutting relationship with the upper central surface of cross head 156 to limit the upward travel thereof.

It will be observed that control of pressure to either end of cylinder 157 will cause cross head 156 and its associated gripper mechanism 150 to be vertically reciprocated from a position between mold sections 16 and 17 to an upper position governed by the setting of adjustable stop bolt 163. In this connection, the lower limit of travel of cross head 156 is adjustable by means of filler or stop blocks 165 (Figs. 1, 2 and 3) embracing the posts 152 and replaceably held in position through the mechanism of a cross bolt 166.

The cantilevered portion of the gripper mechanism 150, which extends forwardly (Fig. 2) from cross head 156 over the molds 14, serves to house a pair of clamping members axially aligned with each of the pistons produced in the molds 14. Referring to Figs. 1, 2 and 3, and in particular to Figs. 4, 5 and 6, the specific construction of the gripper and clamping members will now be described. The gripper mechanism 150 is constructed in the general form of a partitioned box-like structure 168 provided with longitudinal partition webs 169 forming channels at either side thereof, and cross partition webs 170 extending upwardly a portion of the depth of webs 169 (Figs. 2 and 5). A bifurcated shifter member 171, there being one such shifter member for each mold 14, is supported upon the top surfaces of the cross partition webs 170 in sliding assembly within the channels formed by webs 169. An arcuately faced jaw member 172 is disposed within each of the pockets or cavities formed by cross partitions 170, with its arcuate face extending through a cut away portion of the partition webs 169 directly opposite each piston (Figs 4 and 5). Pins 173, secured as by welding within the jaws 172, extend upwardly into angularly disposed slots or grooves 174 machined in the underside of the bifurcated shifters 171, and relative lengthwise movement between the shifters 171 and the housing 168 acts to radially compress or expand the jaws 172 as controlled by the angular slope of grooves 174. Since the housing 168 (Figs. 2 and 5) contains two bifurcated shifter members 171, a dividing web 175 in each of the side channels of housing 168 supports a fixed pin 176 upon both ends of which coiled springs 177 are mounted for compressive engagement with the walls of webs 175 and the end walls of cavities in the adjacent ends of the legs of bifurcated members 171 (Fig. 5). The springs 177 tend to return the shifter members 171, and associated jaws 172, to an expanded or released position, as viewed in Fig. 5.

Cover plates 178 (Figs. 2, 3, 4 and 6) are secured to and enclose the housing 168. Upstanding brackets 179, formed integral with each of the cover plates 178, support a fulcrum pin 180 on which is mounted a double ended lever 181. One end of each of the levers 181 is pin-slot connected at 182 to a shifter member 171, and the opposite end is pin-slot connected at 183 to the movable connecting rod 184 extending from a pneumatic diaphragm type, pressure applying unit 185. The units 185 are each supported by the cover plates 178 on brackets 186 mounted on spaced upstanding bosses 187 formed integral with the cover plates (Figs. 2 and 4). It will be understood that oscillation of the levers 181 about their fulcrum shafts 180 by the application of pressure to units 185 will react to shift the bifurcated members 171 within the housing 168 to contract or expand the jaws 172.

In view of the extent of overhang of the gripper mechanism 150, it has been found desirable to construct this portion of the mechanism from light metal such as aluminum alloy. It has also been found desirable to install a tapered or shouldered pin 191 (Figs. 2 and 8) on the underside of the overhung end of housing 168, which registers with and bottoms in a socket 192 on the main base member 10, when gripper 150 is in its lower piston or casting grasping position. The described pin and socket feature, in combination with the filler blocks 165, insure accurate horizontal positioning of the gripper mechanism in registry with the pistons exposed by separation of mold sections 16 and 17.

*Chute and core chilling mechanisms*

The chute and core chilling mechanisms are to be seen to best advantage in Figs. 1, 2, 3, 10 and 15. Therein a superstructure in the form of a table or platform 201 is secured to the top surface of base member 10 at the right end thereof as viewed in Fig. 1. A pair of spaced parallel bearing blocks or journals 202 are secured to the top surface of superstructure 201 and each supports a tubular shaft member 203 in horizontal position. A cross bar 205 serves as a yoke to rigidly tie the members 203 together, at their front ends, and an inverted U-shaped bar 206 serves a similar purpose at the rear ends of tubular members 203 to thereby present a rigid structure. Intermediate the tubular members 203 is a power cylinder 208 secured to the top surface of superstructure 201 and having its connecting rod 210 (Fig. 3) securely attached to the front yoke 205. From the structure thus far described, it will be observed that forward movement of connecting rod 210 will translate the tubular members 203 from the position they occupy in Fig. 3 to that disclosed in Fig. 10.

The rear ends of tubular members 203 are equipped with connecting elbows 212, rigid piping 214, T-fitting 211, and flexible hose 215, all of which form a communicating system with a liquid coolant or water valve 216 in a supply line for the same. The front ends of tubular members 203 are each provided with an adjustable spray or aspirating nozzle 218 in communication with independent air valves 220, secured to the top surface of platform 201, through the medium of flexible hose connections 219. Striker arms 222 (Fig. 2) adjustably secured to the end of tubular members 203, and reciprocal therewith, serve to strike operating buttons 221 on the air valves 220, which action delivers air to the nozzles 218 to draw liquid coolant from the interior of the tubular members 203 and spray the same on the cores 51, 52 and 53, as illustrated in Fig. 10. The inverted U-shaped bar 206 may be integrally formed with the striker arms 222 (Fig. 2) and secured as a unit to the ends of tubular members 203.

Secured to, and translatable with the above described core chilling system is a piston or casting receiving chute 200. Two inverted U-shaped members 224 and 225 support the chute 200 in the following manner. Member 224 is secured, as by welding, to the underside or bottom of chute 200 and its depending legs are fulcrumed or pivotally supported on a rod or bar 226 extending outwardly from and fixed to the yoke bar 205. The second inverted U-shaped member 225 is secured rigidly to yoke bar 205 and merely acts as a support for the rear end of chute 200 when the latter is in a horizontal position, as viewed in full lines in Fig. 2. A bar 227, secured as by welding to the outboard, overhung depending leg of member 225, is provided with an aperture at its opposite end through which the fulcrum bar 226 extends, the bar 227 serving as an anti-spread member between the inverted U-member 225 and fulcrum bar 226.

It will be appreciated that translation of the core chilling nozzles 218 into the position illustrated in Fig. 10 will carry the chute 200 into the same lateral position with respect to a vertical plane passing through the axes of the molds 14. In this position chute 200 is directly under the gripper mechanism 150 to receive clamped pistons released therefrom.

The chute 200 is also equipped with a projecting rod or finger 230 adjacent its open end 228. In the retracted position of chute 200 (Figs. 1 and 3), the finger 230 extends outwardly into the path traversed by a tripper element 232 adjustably mounted on the gripper mechanism 150. Lowering of the gripper mechanism, then, will tilt chute 200 about its fulcrum pin 226 to discharge castings previously deposited therein through release of the clamps 172 when the chute 200 was directly below the gripper mechanism (Fig. 10). It will be observed that the position of fulcrum 226 is such that chute 200 will normally assume a horizontal position with or without a piston or pistons in the chute. On positive tilting of chute 200, the pistons therein will slide out the open end 228 and enter a stationary conveying trough 234 (Fig. 2) leading away from the casting mechanism, and the chute will then return under its own weight and mounting to its normal horizontal position.

*Power system*

Referring to Fig. 15, a diagrammatic view of the power system for the integrated piston molding mechanism will now be described. In this view, only those elements of the coordinated mechanism are illustrated that are essential to an understanding of the power system.

The reference numeral 236 identifies a fluid pressure, preferably hydraulic, supply unit comprising the usual motor driven pump and tank. Fluid pressure line P and return line R, respectively, are in direct connection with the delivery side of the pump, and the return lines from the various hydraulically operated units employing the system in their functional operation. Also, a valve controlled main or air line HP is provided for supplying air under pressure to certain of the elements incorporated in the mechanism.

Hydraulic cylinders 30 connected to mold sections 16 and 17, as well as to wrist pin boss, bore-controlling cores 40, are connected in pairs to the hydraulic pressure supply 236 through a suitable four-way, single solenoid operated valve G. Energization of the solenoid G operates its associated valve to admit pressure to cylinders 30 to close the mold sections 16 and 17 and position cores 40 in casting position. De-energization of solenoid G, the valve being spring returned, admits hydraulic pressure to open the mold sections 16 and 17 and withdraw the cores 40.

Hydraulic cylinder 72, connected to internal boss-forming core 51, is connected into the hydraulic pressure system 236 through double solenoid operated, four-way valve A—B. Energization of solenoid A operates its associated valve to admit pressure to cylinder 72 to move core 51 inwardly towards the vertical axis of the piston being cast, while de-energization of solenoid A and energization of solenoid B operates the valve to admit pressure to cylinder 72 to move the core 51 outwardly into position for a casting operation.

Hydraulic cylinder 104, connected to internal boss-forming core 52, is connected into the hydraulic pressure supply 236 through double solenoid operated, four-way valve C—D. Energization of solenoid C serves to operate its associated valve to admit pressure to cylinder 104 to move the core 52 inwardly towards the vertical axis of the piston being cast. De-energization of solenoid C and energization of solenoid D operates the valve to admit pressure to cylinder 104 to move core 52 outwardly into its casting position relative to mold section 17.

A second hydraulic cylinder 112 is also associated with core 52 in that it supplies the motive force for reciprocating this core vertically with respect to its related mold 14. Cylinder 112 is connected through its connecting rod 115 to platform 86 and is also connected into the power supply 236 through the medium of single solenoid operated, four-way valve E. On energization of solenoid E, its associated valve is operated to admit pressure to cylinder 112 to lower platform 86 and its supported core 52. The valve being spring returned, de-energization of solenoid E admits pressure to cylinder 112 to raise the core 52 into the casting cavity between mold sections 16 and 17.

Center core 53 is raised and lowered through control and supply of hydraulic pressure to cylinder 138. This cylinder is connected through a single solenoid operated four-way valve F. Energization of solenoid F operates its associated valve to admit pressure to cylinder 138 to lower the core 53. De-energization of solenoid F operates the valve, which is spring returned, to admit pressure to the cylinder to raise the center core 53 into the mold cavity.

Gripper mechanism 150 is reciprocated vertically by pneumatic cylinder 157. This cylinder is connected into the air supply line HP by means of a four-way, single solenoid operated valve H. On energization of solenoid H, its associated valve admits air pressure to cylinder 157 to lower the gripper 150 into position between separated mold sections 16 and 17. De-energization of solenoid H, the valve being spring returned, admits pressure to cylinder 157 to raise the gripper 150.

Pneumatically operated units 185 which serve to operate casting clamping jaws 172 are connected into the air supply line HP through a four-way, double solenoid operated valve I—N. Energization of solenoid I serves to operate its associated valve to admit pressure to units 185 to reciprocate shifter elements 171 to thereby diametrically compress jaws 172 into grasping contact with castings therebetween. De-energization of solenoid I and energization of solenoid N exhausts pressure from units 185 to release the jaws 172 and discharge castings grasped therebetween.

Chute 200, and associated core chilling nozzles 218, are simultaneously reciprocated into and out of position beneath gripper mechanism 150 by operation of pneumatic cylinder 208, which is connected into the air supply line HP through the medium of four-way, single solenoid operated valve J. Energization of solenoid J causes its associated valve to admit pressure to cylinder 208 to translate chute 200 and nozzles 218 inwardly under the gripper mechanism 150. The opposite movement of the chute and nozzles occurs when the solenoid J is de-energized, the valve being of the spring return type.

Internal core vibrator devices 48 are also connected into the air supply line HP through a two-way, solenoid operated valve K. On energization of solenoid K the valve is operated to admit line pressure to the devices 48. De-energization of solenoid K interrupts delivery of pressure to the vibrator devices.

Similarly, a solenoid operated, two-way valve L is provided to control flow of coolant from a suitable source, such as a valve 216 in a water service line, to spray nozzles 218, solenoid L being energized to permit coolant flow and de-energized to interrupt the flow.

Although the power system has been described in terms of pneumatic and hydraulic fluid pressure instrumentalities, it will be apparent to those skilled in this art that a uniform fluid pressure system could be employed throughout, without in any way detracting from the system as hereinabove described.

*Wiring diagram*

Fig. 16 represents a wiring diagram that will now be described in conjunction with the piston molding mechanism selected for purposes of illustrating the invention. Fig. 16 will be described with reference to the electrically energized elements appearing in Fig. 15, and the chart illustrated in Fig. 17.

In Fig. 16, X-1 and X-2 represent conductors from any suitable electrical power source, such as a 110 volt, 60 cycle current supply, across which are connected the various electrical circuits that energize the elements incorporated in the molding mechanism.

The electrical control system includes a vernier timer and a sequence timer. Both timer devices are well known and, in the illustrated mechanism, a vernier timer, Type 2805, and a sequence timer, Type 2411, were obtained from the Automatic Temperature Control Company of Philadelphia, Pennsylvania. It is to be understood that other known types of timing mechanism may be substituted for the precise devices herein selected for purposes of illustrating the invention.

The vernier timer mechanism incorporates a motor B-1, and electromagnetic clutch X, at least two pairs of normally open contacts XC and CM-1, a time interval selector, and mechanism coacting with the selector to effect momentary closure of contacts CM-1 following expiration of a preselected time interval. The vernier timer is employed for the specific purpose of providing a preselected time interval, by adjustment of the selector, for controlling the freezing or setting time of the particular volume of molten metal cast in the molding mechanism, as well as initiating energization and operation of the sequence timer on expiration of the preselected time interval.

The sequence timer comprises a motor M-2 connected to a shaft on which are adjustably mounted a plurality of cams which sequentially close and open an equal number of switch contacts T-1 through T-11 and a pair of contacts CM-2. The contacts CM-2 serve to complete a holding circuit for the sequence timer motor M-2, and maintain this motor energized for one complete revolution of the cam shaft, and then automatically open the motor circuit, preparatory to a repeated or subsequent cycle of operation. During this complete revolution of the sequence timer cam shaft, switch contacts T-1 through T-11 are sequentially actuated, each being held closed for a preset portion of a revolution of the cam shaft representing a definite timing interval.

Assuming that the fluid pressure system 236 (Fig. 15) and pneumatic pressure line HP are both activated to provide a source of available hydraulic and pneumatic pressure; that the mold sections 16 and 17 are closed or in casting position; and that the internal cores 51, 52 and 53, and wrist pin cores 40, are in assembled relationship within the molds 14, an operator of the mechanism initiates a casting cycle by first filling the molds with a molten metal charge of the desired alloy composition. Both molds are preferably filled at the same time by employing a two-spout ladle in pouring registry with adjacent grates 22. On completion of a metal pouring or mold charging operation, the operator immediately depresses and closes master switch MS, and the operation from that time forward is entirely automatic.

Closing of the switch MS completes the circuit for the vernier timer through conductor L-1, normally closed contacts of relay CR-2 and conductor L-2 across the main power supply lines X-1 and X-2 to simultaneously energize the vernier timer motor M-1 and its clutch mechanism X, as well as light a red signal lamp. Contacts XC automatically close in response to energization of the clutch X and provide a holding circuit for motor M-1, clutch X and the signal light. Following the elapsed interval of time, as preselected, the contacts CM-1 close momentarily and connect the sequence timer motor M-2 and control relay CR-2 across the power lines X-1 and X-2. Shortly after contacts CM-1 close, contacts XC are caused to open thereby de-energizing the electromagnetic clutch X, opening the circuit of motor M-1 and the signal light, and resetting the vernier timer for a new or subsequent cycle of operation. It will be observed that the red signal lamp is lighted for that period represented by the time required for the molten metal to solidify and actually acts as a visual danger signal against unwarranted opening of the molds, or the like.

The sequence timer now takes over in the following manner. Sequence timer switch T-1 closes and through conductor L-5 energizes control relay CR-4. Energization of relay CR-4 opens its two normally closed contacts CR-4 in the circuit composed of conductor L-7, solenoid G and conductor L-8 to de-energize solenoid G in the control circuit of hydraulic cylinders 30, which serves to open the mold sections 16 and 17. Energization of relay CR-4 also closes its open contacts CR-4 in the circuit composed of conductor L-6 and open limit switch LS-FU, to prepare this circuit as a holding circuit for relay CR-4, which holding circuit is completed by subsequent closing of limit switch LS-FU prior to time expiration of T-1, as hereinafter described.

Sequence timer contacts T-2, in point of time, are next closed. Automatic closing of switch T-2, through conductors L-9 and L-10, serves to energize solenoid H operating the valve to pneumatic cylinder 157. Energization of solenoid H lowers connecting rod 162 and gripper mechanism 150 into contact with the stop blocks 165, in which lowered position the clamping jaws 172 are diametrically disposed in open or expanded condition on either side of the exposed cast pistons (Figs. 4 and 9). Preferably, sequence timer contacts T-1 and T-2 will be set to close simultaneously so that the gripper mechanism 150 will have travelled downwardly a substantial distance toward the stop blocks 165 by the time the molds 14 assume an open position, which will avoid unnecessary delay in the gripper mechanism reaching its lower position between the open mold sections 16 and 17.

Sequence timer contacts T-3 are next closed to energize control relay CR-5 through conductor L-11. Energization of relay CR-5 closes its two sets of contacts CR-5 in the circuit of conductors L-13 and L-14 to energize solenoid F associated with the hydraulic cylinder 138 for controlling movement of center cores 53. On energization of solenoid F the center core actuating mechanism is operated to withdraw the cores 53 vertically out of position between their complementary side cores 51 and 52. Upon initial movement of the rack bar 135 in effecting center core retraction or withdrawal, the limit switch LS-FU is closed and completes the holding circuit for control relay CR-4, whereby the molds 14 cannot be reclosed until the center cores 53 are moved back into casting position between the side cores 51 and 52. The limit switches LS-FU are suitably attached to a portion of the main frame or base 10, in the path of movement of each rack bar 135, and are manipulated thereby.

The duration or interval of sequence timer contacts T-3 (Fig. 17) is initially selected and set for a sufficient length of time to maintain relay CR-5 energized, and its two pair of contacts CR-5 in the circuit of conductor L-13 closed, so that solenoid F remains energized and central cores 53 withdrawn until the operative movements of side cores 51 and 52 are completed, as will be hereinafter described in more detail.

Sequence timer contacts T-4 are next closed to effect energization of control relay CR-6 through conductor L-15, after gripper mechanism 150 has reached its lowered position. Control relay CR-6 energizes and closes its two normally open sets of contacts CR-6 in the circuit composed of conductors L-16, L-17 and solenoid I. Responsive to energization of solenoid I, air pressure is admitted to pressure applying units 185 to reciprocate shifter elements 171 to diametrically collapse or close clamping jaws 172 to grip the cast pistons therebetween.

Subsequent to gripping the exposed cast pistons, closing of sequence timer contacts T-5 energizes control relay CR-7 in the circuit completed by conductor L-19. Control relay CR-7 has two normally open sets of contacts in the circuit of conductors L-20, L-21 and solenoid K, and on energization of relay CR-7 the open contacts are closed and solenoid K is energized. Solenoid K, on energization, actuates its two-way valve admitting pneumatic pressure to the vibrators 48 to vibrate the cores 51 and 52. The time or interval of vibration expires with the sequence setting of sequence timer contacts T-5 (Fig. 17).

Closing of sequence timer contacts T-6, next in point of elapsed time in the operation of the sequence timer, energizes control relay CR-8 in the circuit of conductors L-22 and L-23. Energization of control relay CR-8 closes its two normally open sets of contacts CR-8 in the circuit of conductors L-24 and L-25 to energize solenoid C. Solenoid C, on energization, through its associated valve and hydraulic cylinders 104 (one cylinder for each core 52) moves side cores 52 in towards the center of the cast pistons into the space vacated by central cores 53.

Closing of sequence timer contacts T-7 energizes control relay CR-9 in the circuit of conductor L-26. Control relay CR-9 has two sets of normally open contacts CR-9 in the circuit of conductors L-27 and L-28, which connect solenoid E across the power lines X-1 and X-2. On energization of relay CR-9, its contacts CR-9 are closed and solenoid E is energized. Solenoid E, on energization, through its associated valve, actuates hydraulic cylinder 112 to lower platform 86 and its supported side cores 52 to the lowered position indicated in Fig. 9.

Closing of sequence timer contacts T-8, through conductor L-29, energizes control relay CR-10 which closes its two sets of normally open contacts CR-10 in the circuit of conductors L-30, L-31 and solenoid D. Solenoid D controls the operation of hydraulic cylinders 104 on energization to move side cores 52 outwardly into contact with stop bars 45, which is identical to that outward position they will occupy during a casting operation, except that these cores have been lowered with platform 86. It is to be noted here that energization of solenoid D to shift or move side cores 52 to an outer position can only take place on expiration of the timing interval established by closed sequence timer contacts T-6 establishing energization of solenoid C. It will be apparent, then, that the duration or setting of the time interval for sequence timer contacts T-3 (Fig. 17) cannot have expired at this point in the cycle of operation, since otherwise solenoid F would become de-energized and central cores 53 start their upward movement.

On closing of sequence timer contacts T-9 a circuit is completed across lines X-1 and X-2 through conductor L-32 and control relay CR-11. Energization of control relay CR-11 closes its normally open two sets of contacts in the circuit composed of conductors L-34 and L-35 to energize solenoid A. On energization, solenoid A actuates its associated valve and admits hydraulic pressure to cylinders 72 (one cylinder for each core 51) to move side cores 51 inwardly towards the center of the cast pistons into the space now vacated by both the central cores 53 and side cores 52 (Fig. 9).

By reference to the operating cycle chart in Fig. 17, it will be observed that the time has expired on sequence timer contacts T-2, whose circuit has enegized solenoid H. This causes de-energization of solenoid H and its associated valve is spring shifted to admit air pressure to cylinder 157 to thereby raise the gripper 150 and its grasped castings to the position indicated in Fig. 2.

Closing of sequence timer contacts T-10, next in point of time, connects conductor L-36 across the lines X-1 and X-2 and energizes control relay CR-12 to close its two normally open sets of contacts in the circuit composed of conductors L-37, L-38 and solenoid B to energize the latter. Energization of solenoid B follows immediately the expiration of the time interval controlled by contact switch T-9 (Fig. 17), and actuates the associated valve controlling hydraulic pressure to cylinders 72 to move cores 51 outwardly into casting position. It is to be noted that energization of solenoid B to shift side cores 51 outwardly into casting position can only take place on expiration of the timing interval established by closed sequence timer contacts T-9.

Closing of sequence timer contacts T-11 prepares the circuit composed of conductor L-39, limit switch LS—H1, conductor L-40 and solenoid J for energization. It is to be observed that limit switch LS—H1, normally open, must be closed to complete this circuit. Closing of LS—H1 is accomplished by contact of the gripper mechanism 150 therewith during its upward movement at some point before the gripper reaches the upper limit of its travel (Fig. 15), for example, when the gripper and is depending clamped pistons passes above the level of chute 200. With solenoid J thus energized, air pressure is admitted to cylinder 208 to translate chute 200 and nozzles 218 into an inward location from that disclosed in Fig. 1 to the position indicated in Fig. 10. It will also be observed that, in the position of chute 200 indicated in Fig. 10, the striker fingers 222 strike buttons 221 on air valves 220 to deliver air pressure to the nozzles 218.

At the end of the inward travel of chute 200 into the position illustrated in Fig. 10, a limit switch LS—J is struck by a moving portion of this unit to close the same. Closing of this limit switch connects control relay CR-3, through conductor L-4, across the main power lines X-1 and X-2. Control relay CR-3 has two sets of normally open contacts CR-3, one of which is in a shunt circuit around sequence timer contacts T-1, and the other of which is in the circuit of conductor L-18 and solenoids L and N. Energization of control relay CR-3, as here described, closes both sets of contacts CR-3 to provide a shunt holding or interlocking circuit energizing control relay CR-4, thereby insuring de-energization of solenoid G to maintain mold sections 16 and 17 open, and to simultaneously energize solenoid L and N. Energization of solenoid L serves to actuate its valve 216 to admit coolant, such as water, to the interior of tubular members 203, and since air pressure has been made available at the nozzles 218, an atomized spray of coolant is delivered upon the internal cores 51, 52 and 53 (Fig. 10). Energization of solenoid N operates to exhaust air pressure in units 185 to release piston clamping jaws 172 to deposit pistons clamped therebetween in the chute 200. It will be noted that energization of solenoid N to operate its associated four-way valve controlling pneumatic pressure to units 185 will only function on de-energization of solenoid I controlling a piston clamping operation. This action of solenoid N, then, can function freely any time after the expiration of sequence timer contacts T-4 (Fig. 17) responsive to closing of limit switch LS—J and energization of control relay CR-3. In this way, positive clamping and unclamping of jaws 172 is insured.

Time expiration of sequence timer contacts T-11 will cause de-energization of solenoid J and its spring return valve, in the pneumatic circuit of cylinder 208, will return the chute 200 and nozzles 218 to the position they occupy, as illustrated in Fig. 1. This retraction operation opens limit switch LS—J to de-energize control relay CR-3. De-energization of control relay CR-3 reacts to open the shunt holding circuit for control relay CR-4 to de-energize the same and close the open contacts CR-4 in the circuit of solenoid G, thereby energizing this solenoid. On energization, solenoid G, through its associated spring return valve, admits hydraulic pressure to cylinders 30 to close the mold sections 16 and 17, as well as force the side cores 48 inwardly into the molds.

Interruption or opening of control relay CR-3 has the further effect of de-energizing the solenoid L, thereby interrupting or closing coolant valve 216.

A counter mechanism is also included in the electrical wiring of the mechanism. The counter mechanism includes a normally open limit switch LS—H2, which is closed when the gripper mechanism 150 reaches its lowest position of travel into contact with filler or stop blocks 165. Limit switch LS—H2 is in the circuit of conductors L-41, L-42, L-43, control relays CR-13 and CR-14, and limit switches LS-1 and LS-2. The latter limit switches are supported on the gripper 150 and are each closed on contact with a cast piston. Closing of limit switches LS—H2, LS-1 and LS-2 can occur only when gripper mechanism 150 is at the bottom of its travel in piston grasping position and, when this occurs the control relays CR-13 and CR-14 are energized to close their normally open contacts in conductors L-44, L-45 and L-46, L-47 to thereby operate two electrical recording counters C-1 and C-2. It will be understood that the counters function independently of each other as each counter has its separate circuit and one each of the limit switches LS-1 and LS-2 is mounted on the gripper 150 to be engaged by only one piston.

Preparatory to starting a new cycle of operation, the sequence timer contacts CM-2 open to de-energize its circuit. It is to be observed that all of the sequence timer contacts T-1 through T-11, as well as energization of solenoids L and N, have been provided with by-passing manual switches. This provision is for emergency use only and is useful in checking through a cycle of operations in the event new molds and cores are substituted to present a new time cycle for a change in casting size or shape.

*Operating cycle*

The operation of the molding mechanism has been described, at least in so far as the various sub-assemblies are concerned, in connection with the aforedescribed power and electrical systems. A complete cycle of operations of the unitary mechanism is now summarized with reference to the cycle chart illustrated in Fig. 17.

Having determined by test the time required for the molten metal charge to set or freeze in the molds of the mechanism and filled the molds with molten metal, the vernier timer is set by proper adjustment of its control dial to indicate the time in seconds when the sequence timer is to take over and automatically control the several mechanical operations represented in the chart of Fig. 17 opposite each of the contacts T-1 through T-11 and their associated solenoids.

Activation of the motor M-2 of the sequence timer immediately reacts to open the mold sections 16 and 17 of the two molds 14. If desired any mold may be taken out of the circuit of sequence timer contacts T-1 and the mechanism operated on the basis of its remaining mold. This applies to any sub-assembly or unit which is dependent on a sequence timer switch and which involves more than a single unit.

The mold sections are held open continuously until the time interval of the last contact switch T-11 expires, or until the casting receiving chute 200 is reciprocated to the right, as illustrated in Fig. 1.

Coincident with the closure of contacts T-1, contacts T-2 are also closed which react to lower the gripper and conveying mechanism 150 to place the same between the open mold sections 16—17 (Fig. 9), where it remains for substantially half the time interval of the open mold period.

Contacts T-3 are then closed after a lapse of a period of 1 to 2 seconds following the initiation of downward movement of the gripper mechanism 150, which sets in motion the mechanism to lower the center cores 53 from their raised casting position within the molds 14.

During the energization period of contacts T-3, contacts T-4 are closed to initiate and operate the clamping jaws 172 to clamp and hold the exposed cast pistons, and approximately simultaneously therewith contacts T-5 are closed to energize the vibrators 48, which are energized for the period of time required to manipulate the side cores 51 and 52 during their withdrawal out of contact with the interior surfaces they define.

Contacts T-6, next closed, serve to initiate translation of side cores 52 away from the interior surface they define into a position towards the central axes of the cast pistons, this space having been vacated by the withdrawal of center cores 53.

Contacts T-7 initiate downward movement of the platform 86 supporting side cores 52, while contacts T-8 move the side cores 52 outwardly on the platform 86 to a position controlled by stop bars 45. The stop bars 45 are accurately positioned to arrest outward movement of cores 52 in exact alignment with the position these cores occupy within the ring 49 when the cores 52 are in metal receiving position within molds 14.

Approximately simultaneously with the closing of contacts T-8, contacts T-9 are closed to initiate translation of side cores 51 in towards the center of the cast pistons.

Closing of sequence timer contacts T-10 occurs promptly after the time elapsed on the sequence initiated by contacts T-9 to return side cores 51 to their outward or casting position, as defined by the ring 49. It will be observed (Fig. 17) that the sequence initiated by contacts T-10 (side cores 51 in outward position) expires with the sequence of contacts T-8 (side cores 52 in outward position).

It is to be observed also that the time interval of closure of contacts T-2 has expired previous to the raising of center cores 53 and side cores 52. This has opened the circuit of contacts T-2 and has permitted the gripper 150, and its grasped pistons to move upwardly out of interference with the outward movement of side cores 51, controlled by contacts T-10, as well as upward movement of cores 52 and 53.

On its upward stroke, gripper 150 closes limit switch LS—H1 at some point in level higher than the chute 200. With limit switch LS—H1 closed, closing of contacts T-11 initiates reciprocation of the chute 200 and coolant nozzles 218 into position under the gripper 150. In this position limit switch LS—J is closed to energize solenoids L and N which provide for spraying the exposed cores 51, 52 and 53 with coolant, as well as releasing the grasped pistons into the chute 200. Operation of the electrically operated counters is entirely through control relays and limit switches and has been fully explained in connection with the wiring diagram.

The sequences performed by contacts T-1 and T-11 expire together closing the molds and reciprocating the chute and nozzles to an outward position, after which the sequence timer contacts CM-2 terminate the cycle of operation with the mechanism in condition for a subsequent cycle.

Generalization

It will be fully appreciated that each mold 14 is a separate unit and that the mechanical features and power systems thereof are duplicated for each such mold unit. On this basis the molds 14 are susceptible to mounting on a turn table, or similar mechanism, in which case each would be equipped with a separate power system and operate in the manner hereinabove described.

It will also be understood that the initiation of a new cycle for the apparatus above described entails lowering of the gripper 150 which brings the projecting fingers 230 and 232 into passing engagement to tilt the chute 200 and discharge its castings into a stationary chute 234.

Alignment and registry of the wrist pin cores 40 and their associated boss-forming cores 51 and 52 is insured by providing raised buttons 41 on the outer faces of the side cores for entry into depressions 42 in the ends of the wrist pin cores (Figs. 8, 9 and 10).

It should also be observed that the mold sections 16 and 17, when in a closed metal receiving position, engage the side cores 51 and 52 (Figs. 9 and 10) adjacent their lower ends below the casting cavity and exert an inward compressive force on the side cores to cause the same to tightly engage a center core 53 therebetween. Furthermore, a similar compressive force is exerted on the side cores 51 and 52, towards their upper ends, by the wrist pin bore-controlling cores 40. This construction, by which the internal core structure is held in tight assembled engagement by the closed mold members 16 and 17 and cores 40, insures uniform dimensional casting accuracy, and substantially increases core life, in that no separated or loose parting planes will exist between adjacent internal core faces to present sharp edges susceptible to the errosive action of molten metal.

The pivotal mounting for hydraulic cylinders 72 and 104 permits axial adjustment of these cylinders for true rectilinear movement of side cores 51 and 52. The pivotal mounting for cylinders 112 and 138 provides for true alignment and axial application of pressure on the platform 86 and rack bar 135, respectively.

It will be further understood that the mechanism described hereinabove in detail is not limited to the production of any one type of piston or cored article, and in the case of a piston or other casting requiring an internal core or cores which permit simultaneous displacement of two internal lateral core sections into the central space vacated by a central core section, without withdrawing one of the lateral cores, it would only be necessary to duplicate the structure of core 51 on both sides of the vertical center line of the mold.

Full equivalents of all of the pressure cylinders herein employed could be substituted in the form of rotatable shafts and linkage members. It is also possible that some or all of the members and moving elements could be hand or manually operated as distinct from the preferred automatic power operation described hereinabove. However, in its automatic form a single operator can operate several machines in that the only manual operations to be performed include filling the molds and closing the master starting switch.

Having clearly and distinctly described and explained the invention in terms of a specific molding apparatus, it is to be understood that no express limitations are to be employed to confine the scope of the invention except as defined in the claims appended hereto.

What is claimed is:

1. In a molding mechanism for casting a tubular article having a mold and interior core mechanism for forming the same, a vertical support at one side of the mold, a core stripping and article conveying mechanism comprising a member reciprocally mounted on said support and equipped with movable elements for grasping and releasing the article to be cast, means associated with said core stripping and conveying mechanism for actuating the movable elements in timed sequence with the exposure of a cast article to grasp and hold the same, means for stripping the interior core structure while the cast article is grasped and held, means for moving the core stripping and conveying mechanism with its grasped cast article to a new location, and means for releasing the movable elements to discharge the cast article at its new location.

2. In a molding apparatus of the class described incorporating slidable mold members forming a casting cavity therebetween and a retractable core structure defining the interior of an article to be cast within the casting cavity, a vertical support at one side of the mold members in closed position, a mechanism reciprocally mounted on said support for grasping and holding a cast article on exposure of the same by sliding separation of the mold members, means for retracting the core structure in timed sequence with and while the cast article is grasped and held, means for translating the grasping and holding mechanism and grasped cast article to a new location out of interference with the mold and core structure, means for reassembling the mold and core structure for a repeated casting operation, a reciprocatory member translatable beneath the grasping and holding mechanism in its new location, and means for releasing the grasped cast article to deposit the same in the reciprocatory member.

3. In a piston casting mechanism, a molding plate, a two-part mold slidably supported on said molding plate, said mold parts defining therebetween the exterior contour of the piston to be cast, a sectional core mechanism mounted below said molding plate and extending upwardly through the same and into the mold to define the interior of the piston, a vertical support mounted adjacent an edge of said molding plate, a conveyor mechanism reciprocable on said support in alignment with the axis of the mold and core mechanism, said conveyor mechanism incorporating piston gripping elements, means for lowering the conveyor mechanism into registry with a cast piston on exposure of the same by slidingly separating the mold halves, means for operating the piston gripping elements to grasp and hold the piston through an external surface clamping action, means for withdrawing the core structure below the molding plate while the piston is so clamped, means for raising the conveyor mechanism and clamped piston out of interference with the mold, and means for releasing the clamped piston to deposit the same in a chute mounted on said plate and reciprocal to a position below said conveyor in its raised position, said chute being pivotally supported to tiltably discharge a cast piston on subsequent lowering of the conveyor to perform a piston clamping operation.

4. In a molding apparatus for producing cast pistons, separable mold members and an internal core structure associated therewith, means for separating the mold members to expose a cast piston, means for removing said cast piston to expose the core structure between the separated mold members, a spray nozzle and a support for the same reciprocally mounted for translation into position adjacent said exposed core structure with the nozzle directed on said exposed core structure, valve means for supplying a measured volume of liquid coolant available to said nozzle, a fixed valve with a projecting stem for supplying air under pressure at said nozzle, and means on said support operable on translation of the nozzle and support therefor to strike said stem to atomize the liquid coolant and spray the core structure.

5. In a molding mechanism for casting cup-shaped articles and including a mold defining the exterior and a core defining the interior surfaces of the article to be cast, a mechanical gripper mechanism movable into position over an exposed cast article to grasp and hold the same during a core stripping operation, means for raising said gripper and grasped article above the mold and core, an article receiving chute translatable into position below the gripper and grasped article in the raised position, a fluid pressure cylinder for operating said chute, a solenoid-operated valve for said cylinder responsive to movement of the gripper to its top position for initiating translation of the chute beneath the raised gripper and grasped article, and a switch responsive to movement of the chute beneath the gripper for initiating release of the grasped article on translation of the chute beneath the same.

6. In a piston casting apparatus comprising a mold support, a mold having a cavity and a sectional core extending into said cavity defining the interior surface of the cast piston, said sectional core comprising oppositely disposed side sections defining interior bosses characterized by an internal unobstructed distance therebetween less than that of the thickness across the greatest width of the side core sections above their boss-defining portions, and a central axially withdrawable core section completing the interior configuration of the piston, the improvement comprising a rectilinearly inclined support having a slight downward incline below said mold, a complementary inclined surface on one side core in bearing relationship on said support, means for translating the side core rectilinearly over said support inclined surface into position in the space vacated by said central core section, means for moving the support and side core section as a unit parallel to the axis of withdrawal of the central core section to move the side core out of the interior of the piston, a second rectilinearly inclined support disposed in fixed relationship exterior to said mold and having a slight downward incline below the mold, a complementary inclined surface on the remaining side core section in bearing relationship on said fixed support, and means for translating the second side core rectilinearly over its fixed support inclined surface into position in the space vacated by the central core section.

7. In a cup-shaped article casting mechanism comprising a mold having a cavity and a sectional core extending into said cavity and defining the interior surface of the cup-shaped article, said sectional core comprising oppositely disposed side sections and an axially withdrawable central section, the improvement comprising a rectilinearly inclined support for each side core section having a slight downward incline below said mold, a complementary inclined surface on each side core in bearing relationship on its support, and means for translating each side core downwardly and inwardly in a rectilinear path along its inclined support into abutting position in the space vacated by the central core section.

8. In a cup-shaped article casting mechanism comprising a mold supporting member, a mold mounted on said member and defining a casting cavity, a sectional core extending into said casting cavity through the mold supporting member and defining the interior surface of the cup-shaped article, said sectional core comprising oppositely disposed side sections and a central axially withdrawable section, the improvement comprising a rectilinearly inclined support for each side core section having a slight incline directed inwardly towards the axis of withdrawal of the central core section and sloping outwardly away from the closed end of the casting cavity, a complementary inclined surface on each side core section in bearing relationship on its inclined support, means for retaining the side core sections in said bearing relationship on their inclined support, and means for translating the side core sections along their inclined supports inwardly towards the axis of withdrawal of the central core section and away from the closed end of the casting cavity into the space vacated by the central core section.

9. In a cup-shaped article casting mechanism comprising a mold supporting member, a mold mounted on said member and defining a casting cavity, a sectional core extending into said casting cavity through the mold supporting member and defining the interior surface of the cup-shaped article, said sectional core comprising oppositely disposed side sections and a central axially withdrawable section, the improvement in core structure comprising a guide box for each side core section exteriorly mounted in respect to said mold and provided with a rectilinearly inclined surface having a slight incline directed inwardly towards the axis of withdrawal of the central core section and sloping outwardly away from the closed end of the casting cavity, a complementary inclined shoe rigidly attached to an end of each side core section extending beyond said mold cavity, each inclined shoe being received within one of the guide boxes in sliding contact over the inclined surface thereof, and means for translating said side core sections inwardly towards the axis of withdrawal of the central core section and away from the closed end of the casting cavity into the space vacated by the central core section.

10. In a molding mechanism for casting a tubular article having a mold and interior sectional core mechanism forming the same, said core mechanism including a core section withdrawable along the axis of the tubular article, a support at one side of the mold, a core stripping and article conveying mechanism comprising a member reciprocally mounted on said support for coaxial movement with the withdrawable core section and in opposite direction thereto, said article stripping and conveying mechanism being equipped with movable elements for grasping and releasing the article to be cast, means associated with said core stripping and conveying mechanism for actuating the movable elements in timed sequence with the exposure of a cast article to grasp and hold the same, means for stripping the interior core mechanism while the cast article is grasped and held, means for moving the core stripping and conveying mechanism with its grasped cast article to a new location, and means for releasing the movable elements to discharge the cast article at its new location.

11. In a molding apparatus for producing interiorly core cast articles, a mold member defining the exterior surface of the cast article, a core structure defining the interior surface of the cast article, means for moving the mold member to expose the cast article, means for grasping the exterior surface of the cast article to hold the same, means for vibrating the core structure to loosen the same, means for moving the core structure out of contact with the interior surface of the cast article, means for translating the cast article grasping means to a new location out of interference with the mold to expose said core structure, a spray nozzle and a support for the same reciprocally mounted for translation into position adjacent said exposed core structure with the nozzle directed on said exposed core structure, valve means for supplying a measured volume of liquid coolant available to said nozzle, a fixed valve with a projecting stem for supplying air under pressure at said nozzle, and means on said support operable on translation of the nozzle and support therefor to strike said stem to atomize the liquid coolant and spray the core structure.

GEORGE C. KOHL.

REFERENCES CITED

The following references are of record in the file of this patent:

UNITED STATES PATENTS

| Number | Name | Date |
|---|---|---|
| 1,417,577 | Skeppstedt | May 30, 1922 |
| 1,538,584 | Owen et al. | May 19, 1925 |
| 1,663,693 | Feltes | Mar. 27, 1928 |
| 1,756,602 | Morris et al. | Apr. 29, 1930 |
| 1,792,801 | Blackwell | Feb. 17, 1931 |
| 1,987,752 | Salzman | Jan. 15, 1935 |
| 2,015,975 | Sulprizio | Oct. 1, 1935 |
| 2,070,649 | Cox et al. | Feb. 16, 1937 |
| 2,124,529 | Lester et al. | July 21, 1938 |
| 2,190,496 | Wagner | Feb. 13, 1940 |
| 2,286,994 | Nocar | June 16, 1942 |
| 2,287,524 | Jackson | June 23, 1942 |